(12) United States Patent
Nakajima

(10) Patent No.: US 7,990,693 B2
(45) Date of Patent: Aug. 2, 2011

(54) ELECTRONIC APPARATUS

(75) Inventor: Yuji Nakajima, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/777,213

(22) Filed: Jul. 12, 2007

(65) Prior Publication Data

US 2008/0019085 A1    Jan. 24, 2008

(30) Foreign Application Priority Data

Jul. 20, 2006 (JP) ................................. 2006-198284

(51) Int. Cl.
*G06F 1/16* (2006.01)
*H05K 5/00* (2006.01)
*H05K 7/00* (2006.01)

(52) U.S. Cl. .......... 361/679.09; 361/679.08; 361/379.17

(58) Field of Classification Search .................. 200/5 A, 200/302.1, 302.2; 361/679.08, 679.09, 679.17
See application file for complete search history.

(56) References Cited

U.S. PATENT DOCUMENTS

| | | | | |
|---|---|---|---|---|
| 5,335,141 A | * | 8/1994 | Hosoi | 361/680 |
| 5,510,953 A | * | 4/1996 | Merkel | 361/680 |
| 5,966,284 A | * | 10/1999 | Youn et al. | 361/680 |
| 6,437,773 B1 | | 8/2002 | Kornmayer et al. | |
| 6,480,373 B1 | * | 11/2002 | Landry et al. | 361/679.06 |
| 6,610,944 B2 | | 3/2003 | Lee | |
| 7,038,598 B2 | * | 5/2006 | Uke | 341/20 |
| 7,619,880 B2 | | 11/2009 | Liang et al. | |
| 7,723,624 B2 | * | 5/2010 | Nakajima | 200/5 A |
| 2008/0174927 A1 | * | 7/2008 | Shen et al. | 361/91.5 |

FOREIGN PATENT DOCUMENTS

| | | |
|---|---|---|
| CN | 2438156 Y | 9/2008 |
| JP | 63-50417 U | 4/1988 |
| JP | H 05-289773H A | 11/1993 |
| JP | 3023496 | 1/1996 |
| JP | H08-076881 A | 3/1996 |
| JP | H 11-175186 A | 7/1999 |
| JP | H11-345041 A | 12/1999 |
| JP | 2002-507787 A | 3/2002 |
| JP | 3089907 | 8/2002 |
| JP | 2003-122454 | 4/2003 |
| JP | 3098371 U | 9/2003 |
| JP | 2005-302384 A | 10/2005 |
| JP | 2006-019384 A | 1/2006 |
| JP | 2006-099550 A | 4/2006 |
| JP | 2006-099551 A | 8/2008 |

OTHER PUBLICATIONS

English Translation of Japanese Office Action dated May 27, 2008.

(Continued)

*Primary Examiner* — Renee Luebke
*Assistant Examiner* — Lheiren Mae Caroc
(74) *Attorney, Agent, or Firm* — Knobbe, Martens Olson and Bear, LLP

(57) ABSTRACT

According to one embodiment, an electronic apparatus is provided with a housing including a top wall and a side portion extending from an edge of the top wall, a keyboard, and a keyboard placing portion on which the keyboard is placed, the keyboard placing portion including a bottom surface provided in the top wall. At least part of the bottom surface extends to the side portion of the housing.

10 Claims, 25 Drawing Sheets

OTHER PUBLICATIONS

English Translation of Chinese Office Action dated Jul. 4, 2001.

Office Action mailed Mar. 12, 2009 in U.S. Appl. No. 12/184,188, filed Jul. 31, 2008.

Office Action Response filed May 20, 2009 issued in U.S. Appl. No. 12/184,188, filed Jul. 31, 2008.

Final Office Action mailed Sep. 4, 2009 in U.S. Appl. No. 12/184,188, filed Jul. 31, 2008.

Office Action mailed May 1, 2009 issued in U.S. Appl. No. 12/184,157, filed Jul. 31, 2008.

Office Action Response filed Jul. 3, 2009 in U.S. Appl. No. 12/184,157, filed Jul. 31, 2008.

Final Office Action mailed Nov. 2, 2009 issued in U.S. Appl. No. 12/184,157, filed Jul. 31, 2008.

RCE and Amendment filed Dec. 2, 2009 in U.S. Appl. No. 12/184,188, filed Jul. 31, 2008.

Notice of Allowance issued Jan. 13, 2010 in U.S. Appl. No. 12/184,188, filed Jul. 31, 2008.

English Translation of Notice of Reasons for Rejection mailed on Jun. 8, 2010 by the Japanese Patent Office for Japanese Patent Application No. 2008-192383.

English Translation of Notice of Reasons for Rejection mailed Jun. 15, 2010 by the Japanese Patent Office for Japanese Patent Application No. 2008-192384.

\* cited by examiner

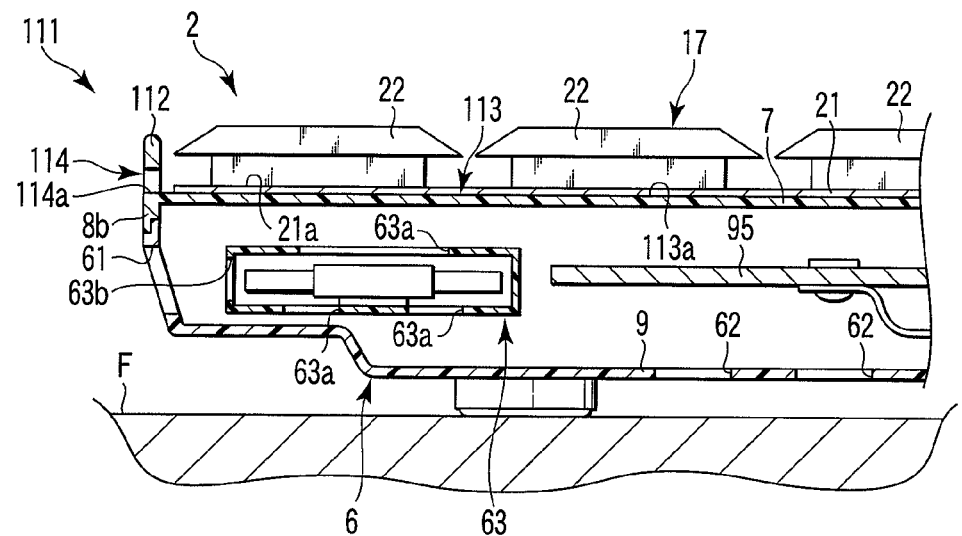
F I G. 19
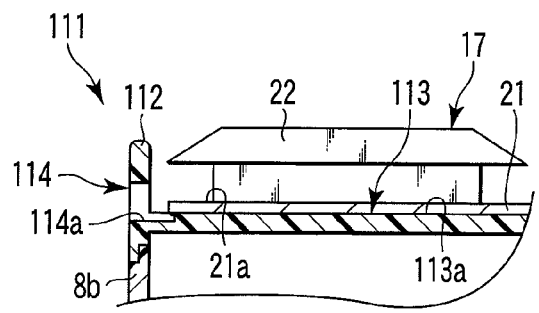
F I G. 21
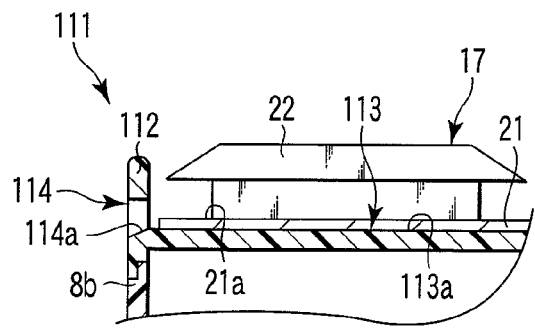
F I G. 22

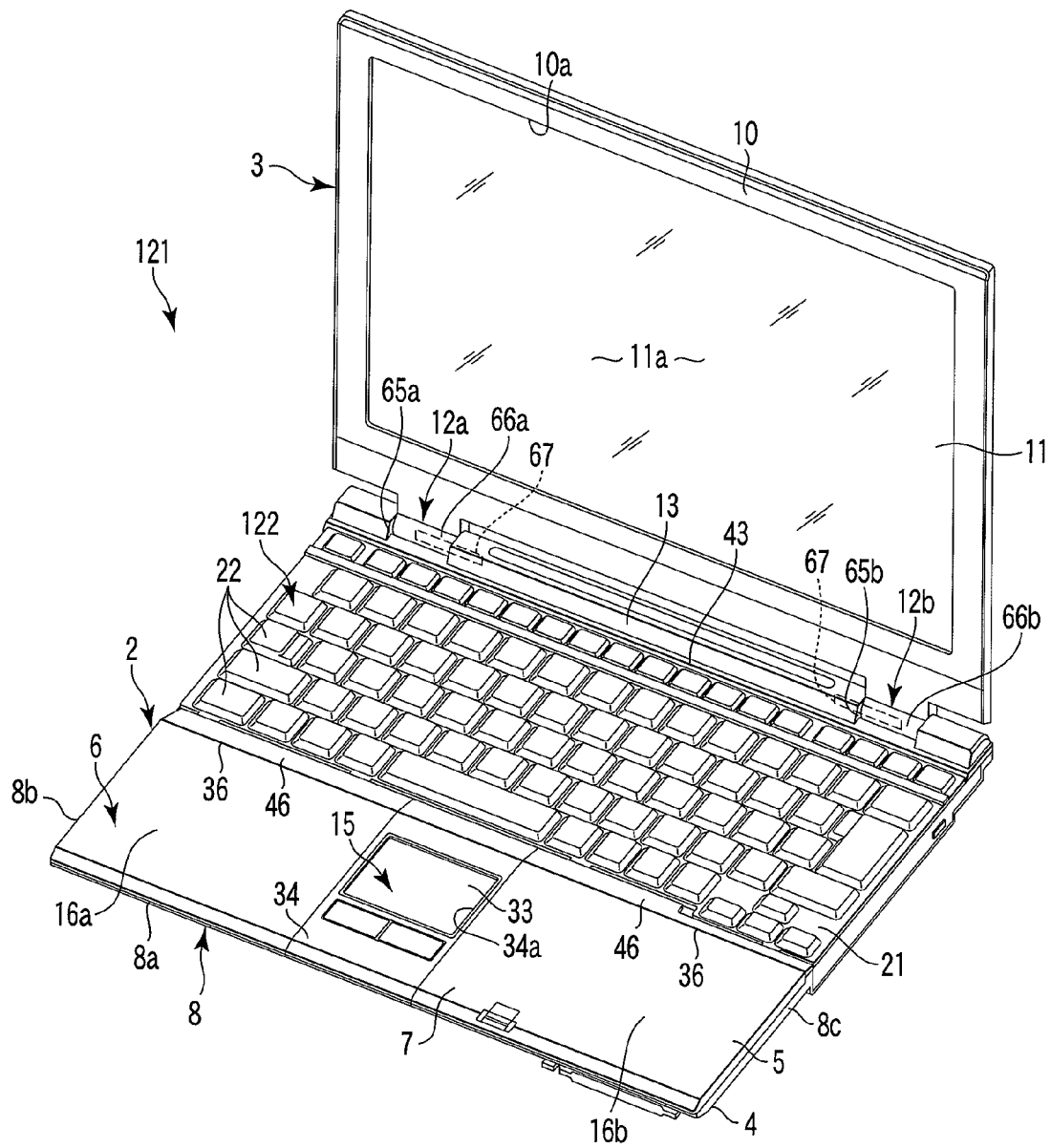
F I G. 23

ELECTRONIC APPARATUS

CROSS-REFERENCE TO RELATED APPLICATIONS

This application is based upon and claims the benefit of priority from Japanese Patent Application No. 2006-198284, filed Jul. 20, 2006, the entire contents of which are incorporated herein by reference.

BACKGROUND

1. Field

One embodiment of the invention relates to an electronic apparatus including a keyboard placing portion on which a keyboard is placed.

2. Description of the Related Art

Electronic apparatuses such as portable computers having a keyboard placing portion in a top wall of a housing thereof. Generally, the keyboard placing portion is provided with a recessed shape in the top wall of the housing. Therefore, if liquid such as coffee or water is accidentally spilled on the electronic apparatuses, the liquid may remain in the keyboard placing portion.

Jpn. Pat. Appln. KOKAI Pub. No. 2003-122454 discloses a computer having a keyboard placing portion provided with drain mechanism. The computer has a first drain hole formed in a base of the keyboard. A guide channel having a second drain hole is provided below the first drain hole. Further, a third drain hole opened to the outside of the computer is provided below the second drain hole.

The drain mechanism has a plurality of drain holes formed in the housing. Since the drain holes run through the inside of the housing, liquid may leak from the drain holes into the housing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 19 is an exemplary cross-sectional view of the portable computer according to the third embodiment;

FIG. 21 is an exemplary cross-sectional view of another modification of the portable computer according to the third embodiment;

FIG. 22 is an exemplary cross-sectional view of another modification of the portable computer according to the third embodiment;

FIG. 23 is an exemplary perspective view of a portable computer according to a fourth embodiment of the present invention;

DETAILED DESCRIPTION

Various embodiments according to the invention will be described hereinafter with reference to the accompanying drawings. In general, according to one embodiment of the invention, an electronic apparatus is provided with a housing including a top wall and a side portion extending from an edge of the top wall, a keyboard, and a keyboard placing portion on which the keyboard is placed, the keyboard placing portion including a bottom surface provided in the top wall. At least part of the bottom surface extends to the side portion of the housing.

Embodiments of the present invention, in which the present invention is applied to portable computers, are described below with reference to drawings.

Figure 1:
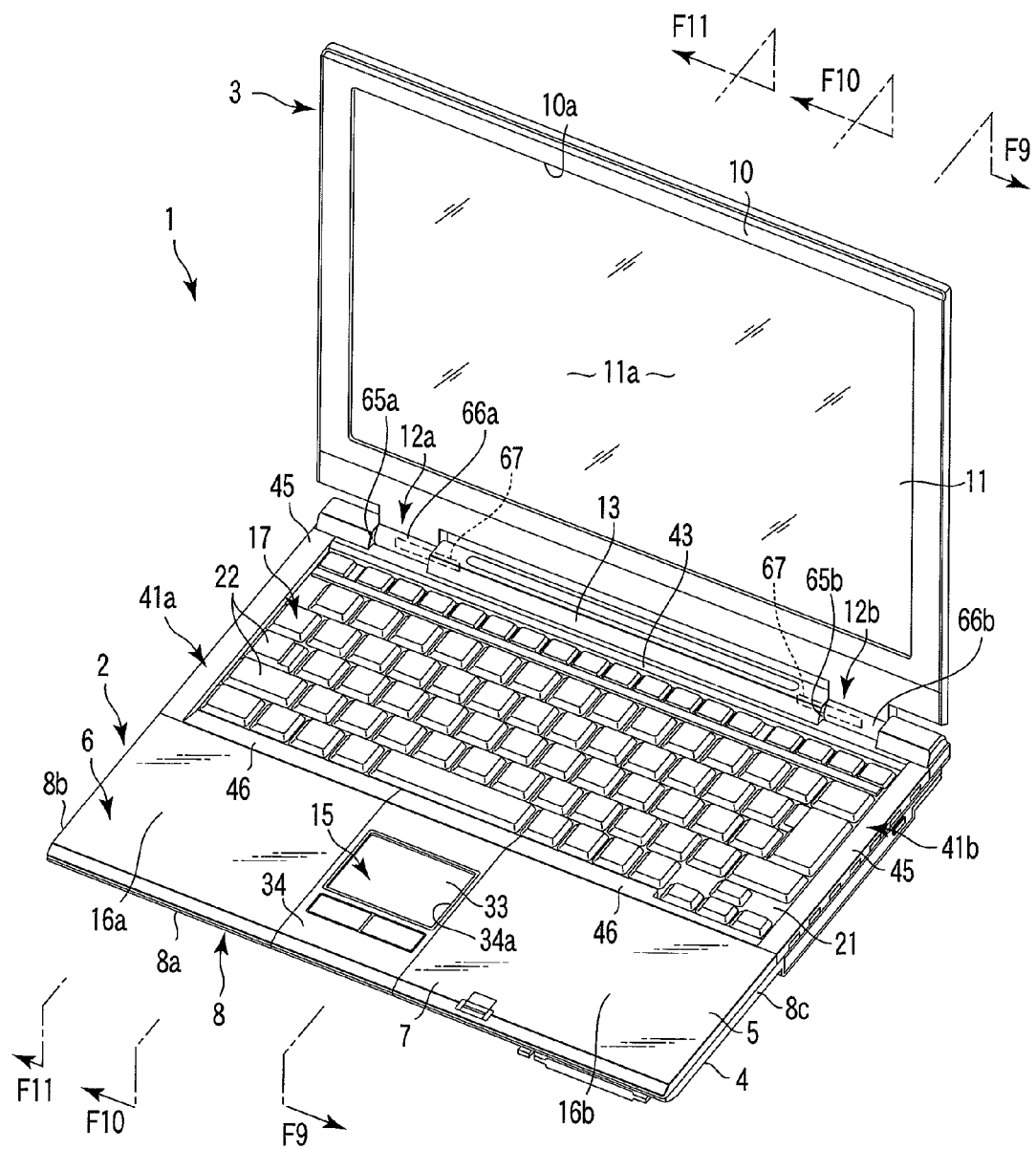
FIG. 1 is an exemplary perspective view of a portable computer according to a first embodiment of the present invention.

FIGS. 1 to 13 disclose a portable computer 1 serving as an electronic apparatus according to a first embodiment of the present invention. As illustrated in FIG. 1, the portable computer 1 is provided with a main body 2 and a display unit 3.

The main body 2 has a housing base 4 and a housing cover 5. The housing cover 5 is combined with the housing base 4 from above. The main body 2 has a box-shaped housing 6 formed of the housing base 4 combined with the housing cover 5. The housing 6 has a top wall 7, a peripheral wall 8, and a bottom wall 9. The peripheral wall 8 has a front sidewall portion 8a extending from a front edge of the top wall 7, a left sidewall portion 8b extending from a left edge of the top wall 7, a right sidewall portion 8c extending from a right edge of the top wall 7, and a rear sidewall portion 8d extending from a rear edge of the top wall 7. That is, the four sidewall portion 8a, 8b, 8c, 8d extend from mutually different edges of the top wall 7.

The front sidewall portion 8a, the left sidewall portion 8b, the right sidewall portion 8c, and the rear sidewall portion 8d are examples of side portions of the present invention. The side portions may not have flat surfaces. For example, the side portions may be curved sidewall portions.

The display unit 3 has a display housing 10, and a liquid crystal display panel 11 contained in the display housing 10. The liquid crystal display panel 11 has a display screen 11a. The display screen 11a is exposed to the outside of the housing 6 through an opening portion 10a formed in a front surface of the display housing 10.

The display unit 3 is rotatably supported by a rear end portion of the housing 6 via a pair of hinge parts 12a and 12b. Therefore, the display unit 3 is rotatable between a closed position where the display unit 3 is laid down to cover the top wall 7 from above, and an open position where the display unit 3 stands to expose the top wall 7.

Figure 2:
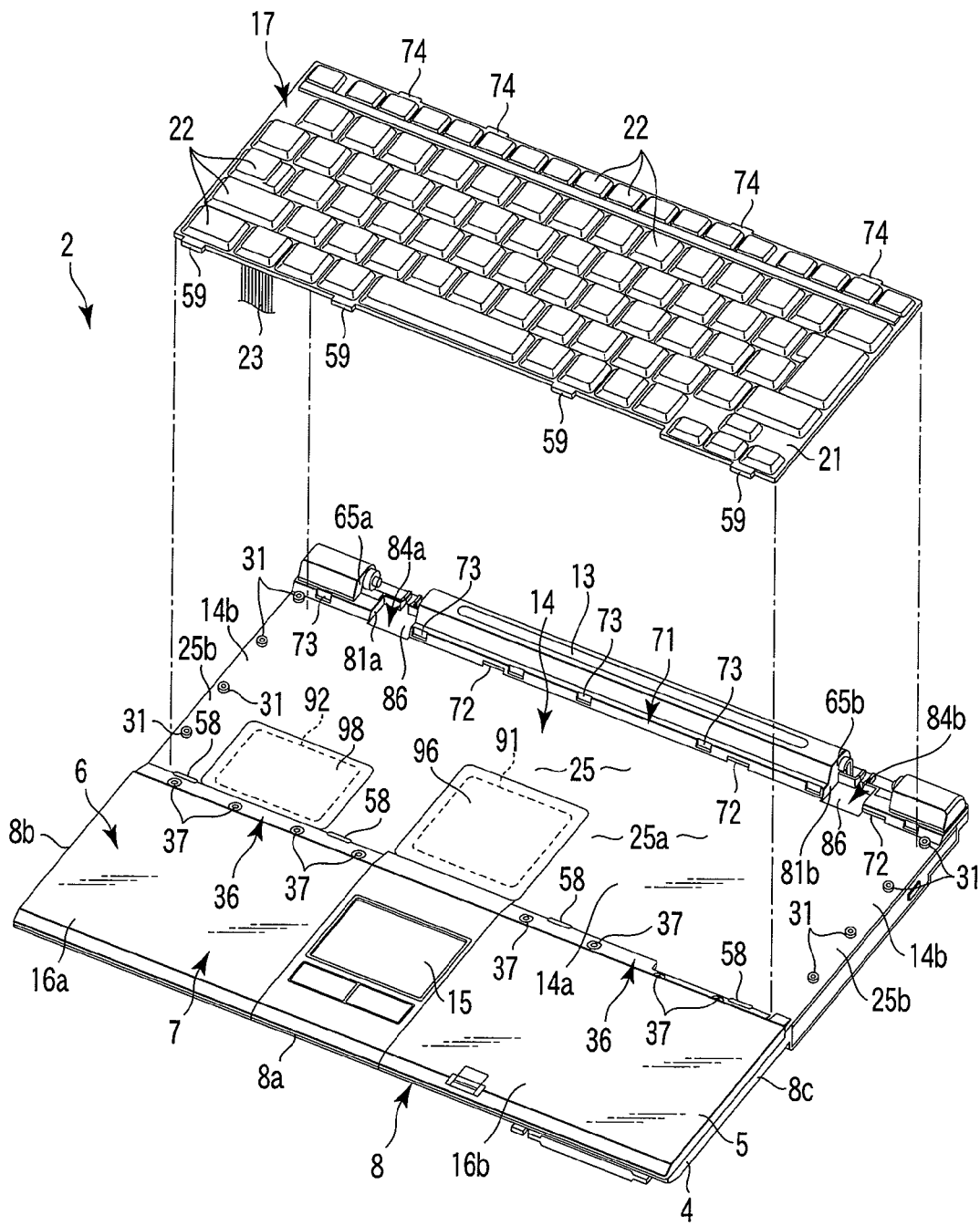
FIG. 2 is an exemplary exploded perspective view of the portable computer according to the first embodiment.

As illustrated in FIG. 2, the top wall 7 of the housing 6 is provided with a projecting portion 13, a keyboard placing portion 14, a touchpad part 15, and a pair of palm rest portions 16a and 16b in this order from the rear end side. A keyboard 17 is placed on the keyboard placing portion 14. The keyboard placing portion 14 supports the keyboard 17 from below.

The keyboard 17 has a base 21, a plurality of keys 22 mounted on the base 21, and a wire member (not shown) having wires and electric contacts. The wire member is electrically connected with, for example, a flexible flat cable (FFC) 23. An example of the base 21 includes a sheet metal member, and a plate member which is superposed on the sheet metal member and to which a support mechanism of the keys 22 is provided.

First, the keyboard placing portion 14 is explained in detail with reference to FIG. 2. The keyboard placing portion 14 is provided to extend from the left edge to the right edge of the top wall 7 of the housing 6. The keyboard placing portion 14 has a bottom surface 25 provided in the top wall 7. The bottom surface 25 extends from a central portion of the top wall 7 to the left sidewall portion 8b of the housing 6, and extends to the right sidewall portion 8c of the housing 6. Specifically, the bottom surface 25 of the keyboard placing portion 14 is formed to extend from the left edge to the right edge of the top wall 7 of the housing 6. In other words, the bottom surface 25 extends to the sidewall portions 8b and 8c of the housing 6, in longitudinal end portions of the keyboard placing portion 14.

As illustrated in FIG. 2, the keyboard placing portion 14 has a first region 14a and second regions 14b. The first region 14a is formed in a central portion of the keyboard placing portion 14. The first region 14a receives the keyboard 17, and is opposed to the lower surface of the keyboard 17. The second regions 14b are formed between the first region 14a and the left sidewall portion 8b of the housing 6, and between the first region 14a and the right sidewall portion 8c of the housing 6. The bottom surface 25 of the keyboard placing portion 14 includes a bottom surface 25a positioned in the first region 14a, and bottom surfaces 25b positioned in the respective second regions 14b.

Figure 7:
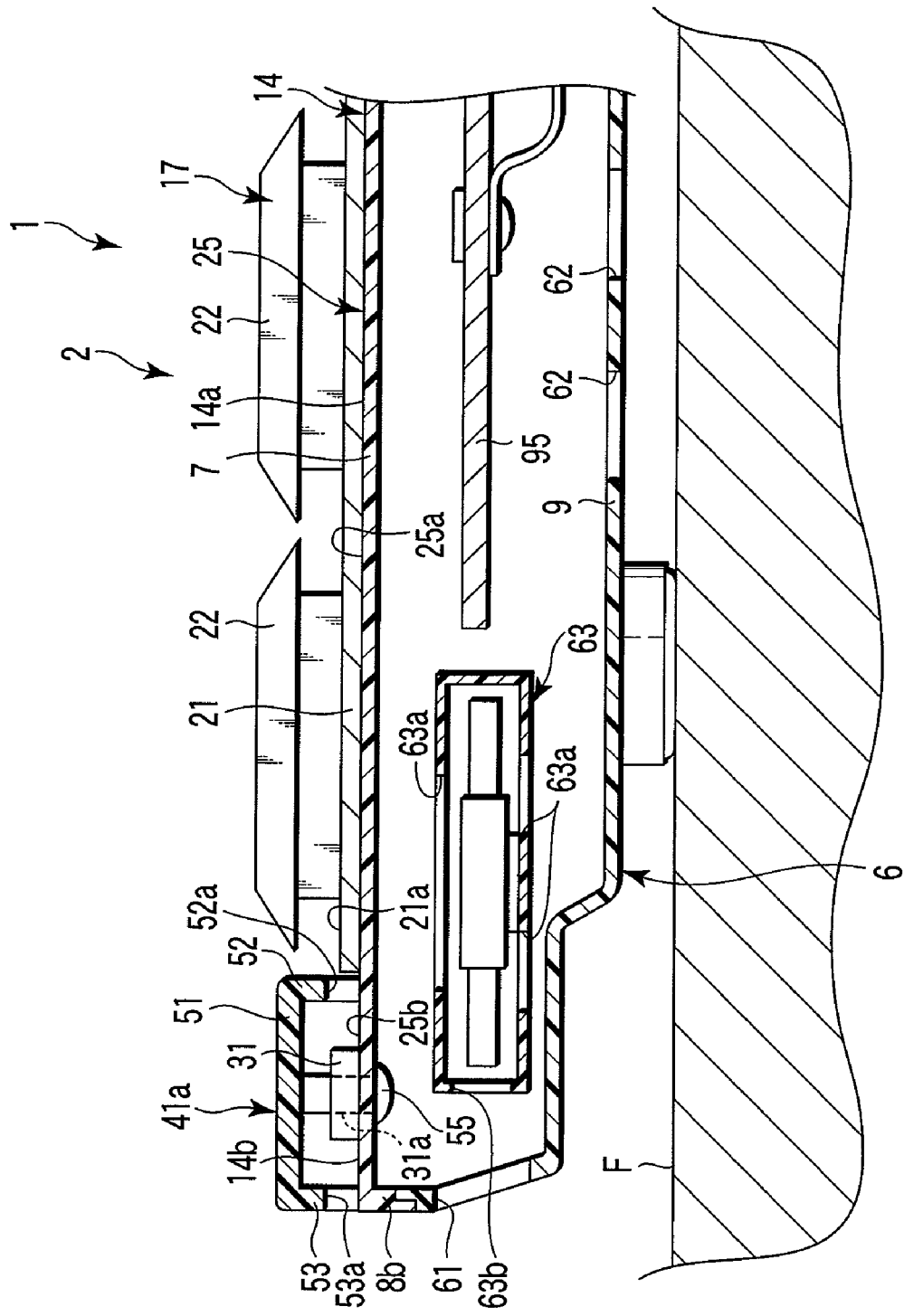
FIG. 7 is an exemplary cross-sectional view of the portable computer of the first embodiment, taken along line F7-F7 of FIG. 5.

As illustrated in FIG. 7, in the keyboard placing portion 14 of the first embodiment, the bottom surfaces 25b of the second regions 14b are positioned on the same plane as the bottom surface 25a of the first region 14a. Specifically, the height of the bottom surfaces 25b of the second regions 14b is the same as the height of the bottom surface 25a of the first region 14a. In other words, the height of the bottom surfaces 25b of the second regions 14b is lower than the height of a top surface 21a of the base 21 of the keyboard 17 placed on the first region 14a. The term "height" in the specification of the present application indicates a height from a placing surface F such as a desktop, on which the portable computer 1 is placed.

As illustrated in FIG. 2, a plurality of first engaging parts 31 are formed in the second regions 14b. The first engaging parts 31 are, for example, cylindrical projections projecting upward from the bottom surface 25 of the keyboard placing portion 14. A first engaging hole 31a opened to the inside of the housing 6 is formed in each of the first engaging parts 31.

Figure 9:
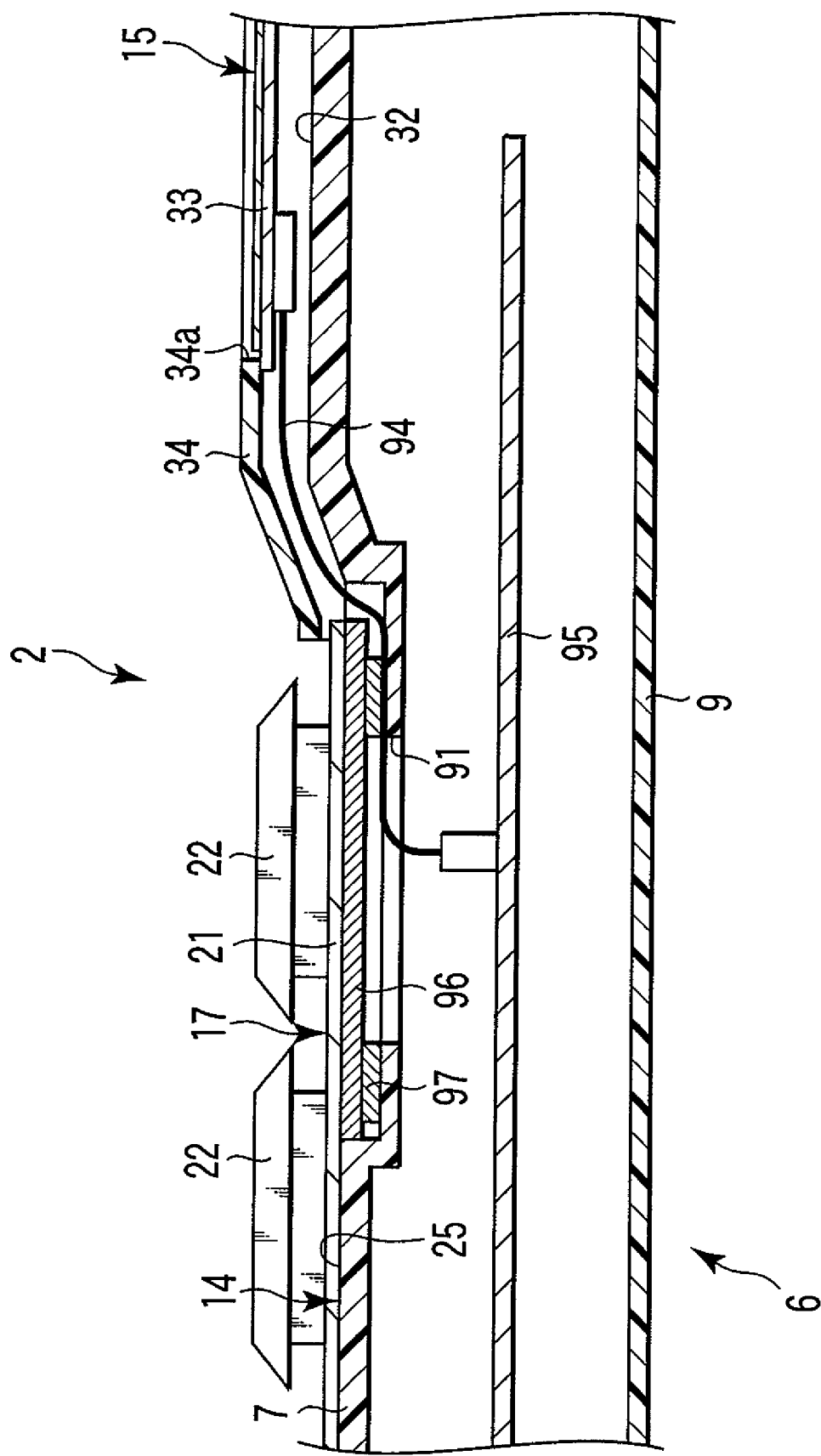
FIG. 9 is an exemplary cross-sectional view of the portable computer of the first embodiment, taken along line F9-F9 of FIG. 1.

As illustrated in FIG. 2, the touchpad part 15 and the palm rest portions 16a and 16b are formed in front of the keyboard placing portion 14. The touchpad part 15 is provided in a longitudinal central portion of the housing 6. As illustrated in FIG. 9, the touchpad part 15 has a touchpad placing portion 32, a touchpad unit 33, and a touchpad cover 34.

The touchpad placing portion 32 is formed in the top wall 7 of the housing 6. The touchpad unit 33 is mounted on the touchpad placing portion 32. The touchpad cover 34 is attached to the touchpad placing portion 32 and covers the touchpad unit 33. The touchpad unit 33 is exposed to the outside through an opening portion 34a of the touchpad cover 34.

As illustrated in FIG. 2, the palm rest portions 16a and 16b are provided on the left and the right of the touchpad part 15 to hold the touchpad part 15 therebetween. The palm rest portions 16a and 16b of the first embodiment are formed as one body with the top wall 7 of the housing 6. The palm rest portions 16a and 16b are raised upward from the housing 6 to be higher than the keyboard placing portion 14.

A first holder placing portion 36 is provided between the keyboard placing portion 14 and the palm rest portions 16a and 16b. The first holder placing portion 36 extends along the longitudinal direction of the housing 6. The first holder placing portion 36 is inclined from edges of the palm rest portions 16a and 16b toward the bottom surface 25 of the keyboard placing portion 14. A plurality of second engaging parts 37 are provided in the first holder placing portion 36. A second engaging hole 37a opened to the inside of the housing 6 is formed in each of the second engaging parts 37.

Figure 3:
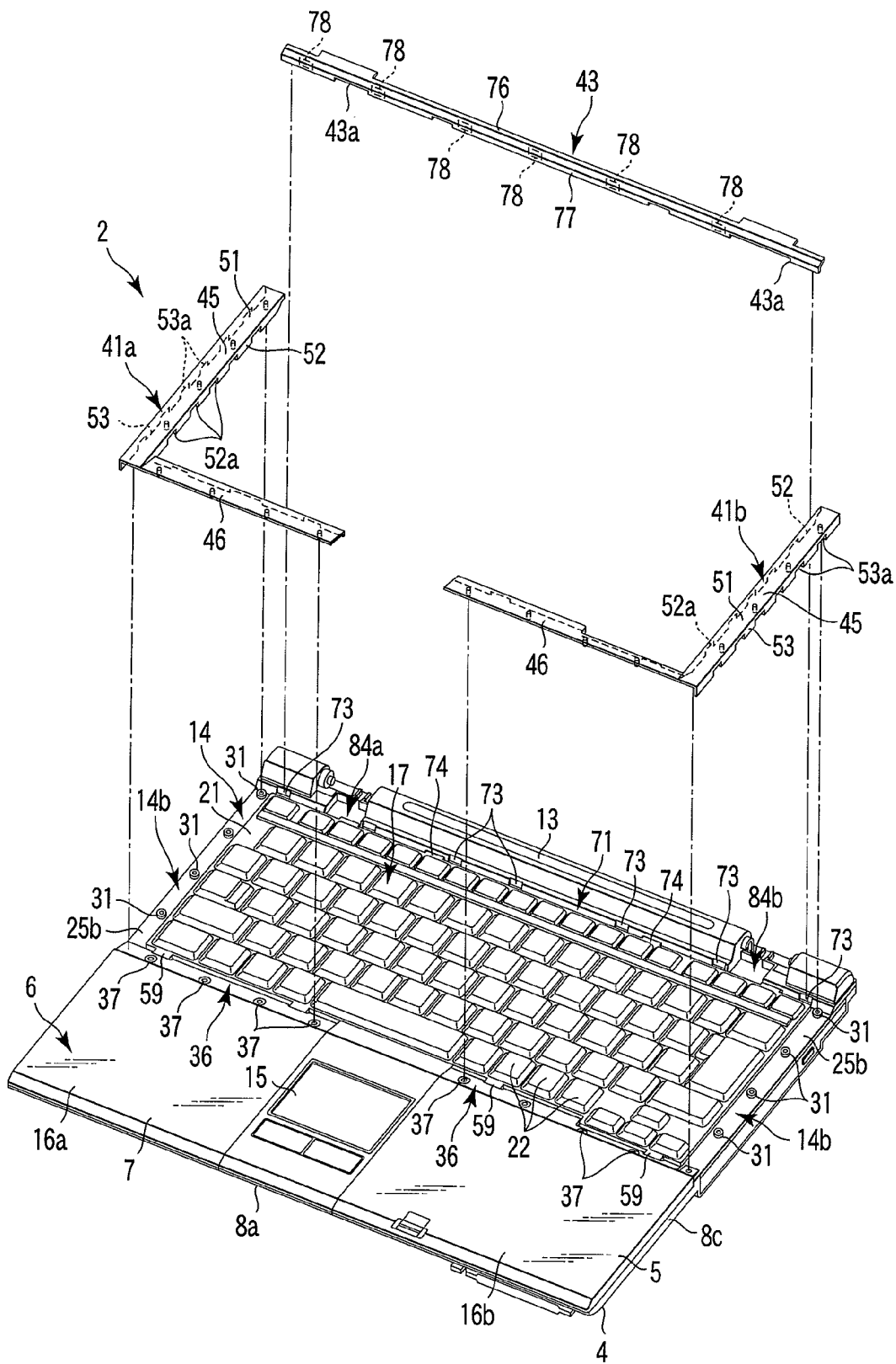
FIG. 3 is an exemplary another exploded perspective view of the portable computer according to the first embodiment.

As illustrated in FIG. 3, a left and a right frame members 41a and 41b and a keyboard holder 43 are attached to the top wall 7 of the housing 6. The left and right frame members 41a and 41b have almost the same structure. Therefore, only the left frame member 41a is explained in the first embodiment, and explanation of the right frame member 41b is omitted by denoting constituent elements having the same functions as those of the left frame member 41a by the same respective reference numerals.

Figure 4:
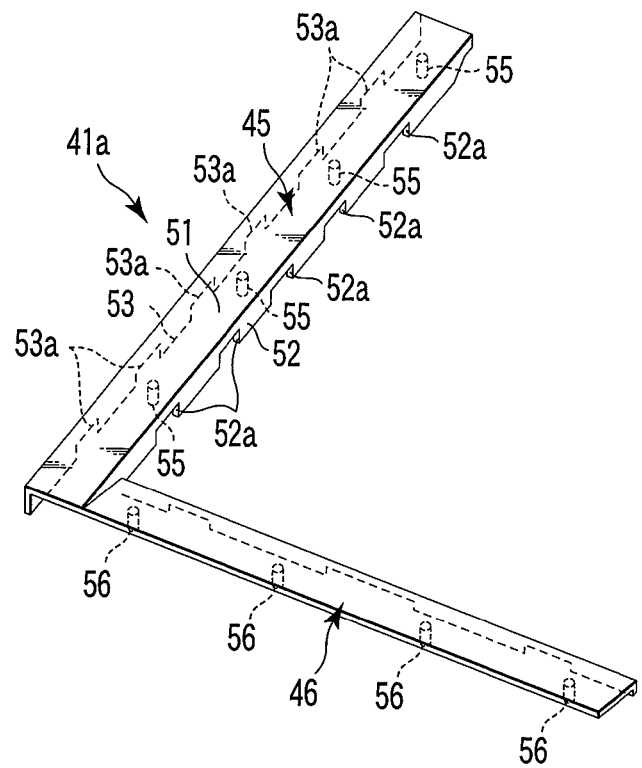
FIG. 4 is an exemplary perspective view of a frame member according to the first embodiment.

As illustrated in FIG. 4, the left frame member 41a (hereinafter simply referred to as "frame member 41a") has a first portion 45 and a second portion 46 which extend in different directions perpendicular to each other. The first portion 45 is an example of a main body part of the frame member in the present invention. The second portion 46 is an example of a holder which holds the keyboard 17.

As illustrated in FIG. 3, when the frame member 41a is attached to the top wall 7 of the housing 6, the first portion 45 is placed in one of the second regions 14b of the keyboard placing portion 14, and the second portion 46 is placed in the first holder placing portion 36. The first portion 45 has almost the same external shape as that of the second regions 14b of the keyboard placing portion 14. The second portion 46 has almost the same external shape as that of the first holder placing portion 36.

As illustrated in FIG. 4, the first portion 45 has a ceiling wall portion 51, a first sidewall portion 52, and a second sidewall portion 53. As illustrated in FIG. 7, when the frame member 41a is attached to the top wall 7 of the housing 6, the ceiling wall portion 51 is opposed to the second region 14b from above, and forms a gap between the ceiling wall portion 51 and the bottom surface 25b of the second region 14b. The first sidewall portion 52 extends from an edge portion of the ceiling wall portion 51, which faces the keyboard 17, toward the housing 6, and abuts the bottom surface 25b of the second region 14b. The second sidewall portion 53 extends from an edge portion of the ceiling wall portion 51, which faces the outside of the housing 6, toward the housing 6, and abuts the bottom surface 25b of the second region 14b.

Figure 5:
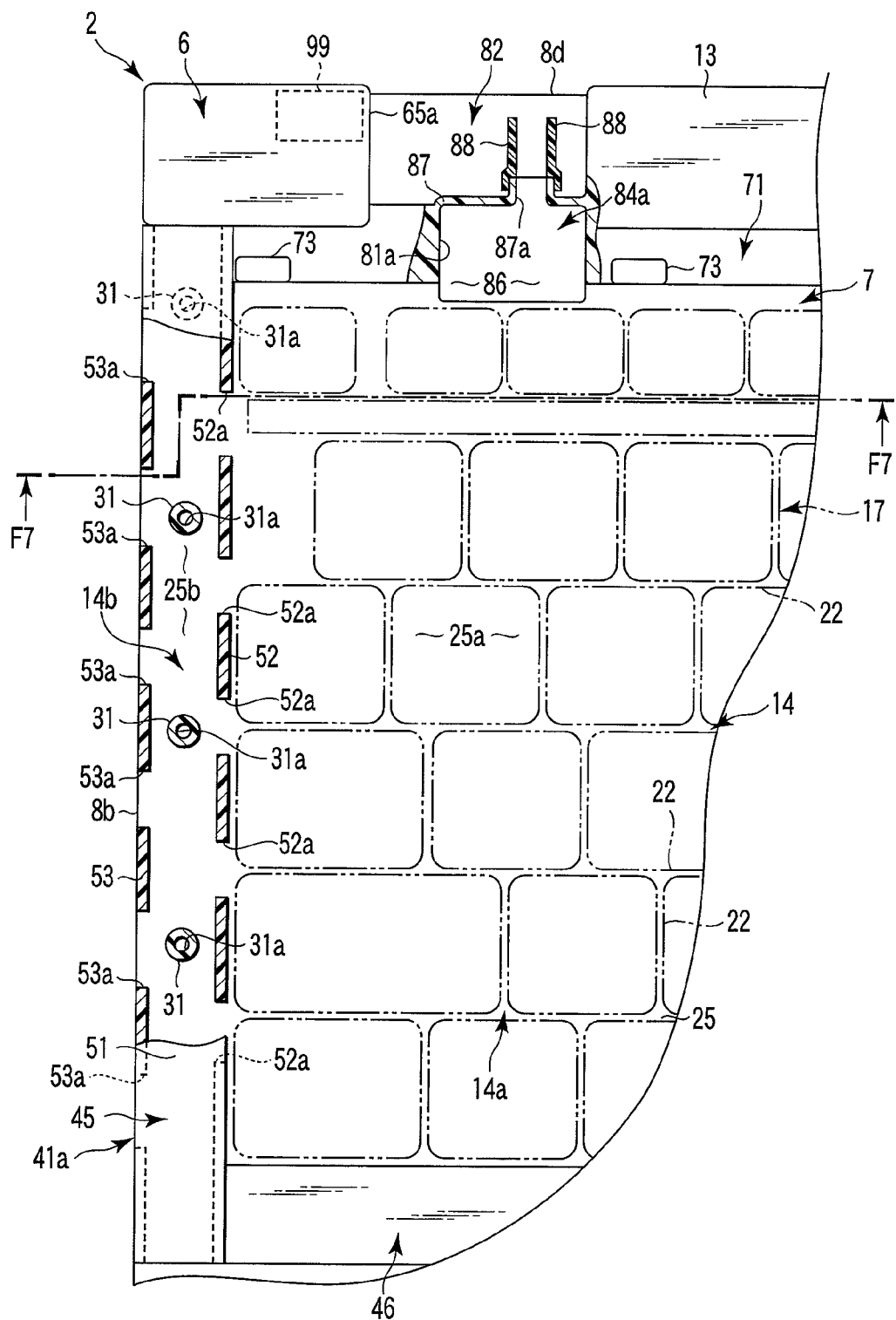
FIG. 5 is an exemplary plan view including a cross section of a part of the portable computer according to the first embodiment.

As illustrated in FIGS. 4 to 7, the first sidewall portion 52 has a plurality of cut-off portions 52a. The cut-off portions 52a cut off the lower end portion of the first sidewall portion 52 in a recessed shape. When the frame member 41a is attached to the top wall 7 of the housing 6, a gap is formed between each of the cut-off portions 52a and the bottom surface 25 of the keyboard placing portion 14. As illustrated in FIG. 5, the cut-off portions 52a of the first sidewall portion 52 are formed in positions opposed to respective gaps between adjacent keys 22 of the keyboard 17, for example. However, the cut-off portions 52 are not necessarily formed in positions opposed to gaps between adjacent keys 22.

The second sidewall portion 53 has a plurality of cut-off portions 53a. The cut-off portions 53a cut off the lower end portion of the second sidewall portion 53 in a recessed shape. When the frame member 41a is attached to the top wall 7 of the housing 6, a gap is formed between each of the cut-off portions 53a and the bottom surface 25 of the keyboard placing portion 14. As illustrated in FIGS. 5 and 7, the keyboard placing portion 14 communicates with the side of the housing 6 through the cut-off portions 52a of the first sidewall portion 52 and the cut-off portions 53a of the second sidewall portion 53. Therefore, it can be said that the second regions 14b of the keyboard placing portion 14 have a liquid-guiding portion, which extends to the left sidewall portion 8b of the housing 6 while keeping the same height as that of the bottom surface 25 of the keyboard placing portion 14.

As illustrated in FIG. 5, the cut-off portions 53a of the second sidewall portion 53 are formed in areas shifted from the areas opposed to the cut-off portions 52a of the first sidewall portion 52. Specifically, the cut-off portions 53a of the second sidewall portion 53 are formed in positions offset from the cut-off portions 52a of the first sidewall portion 52.

As illustrated in FIG. 4, a plurality of engaging projections 55 project downward from the ceiling wall portion 51 of the first portion 45 of the frame member 41a. As illustrated in FIG. 7, the engaging projections 55 are inserted through the respective first engaging holes 31a of the first engaging parts 31 provided in the second regions 14b. Distal ends of the engaging projections 55 inserted through the first engaging holes 31a are welded to the housing 6 inside the housing 6. Thereby, the first portion 45 is fixed to the housing 6.

Figure 10:
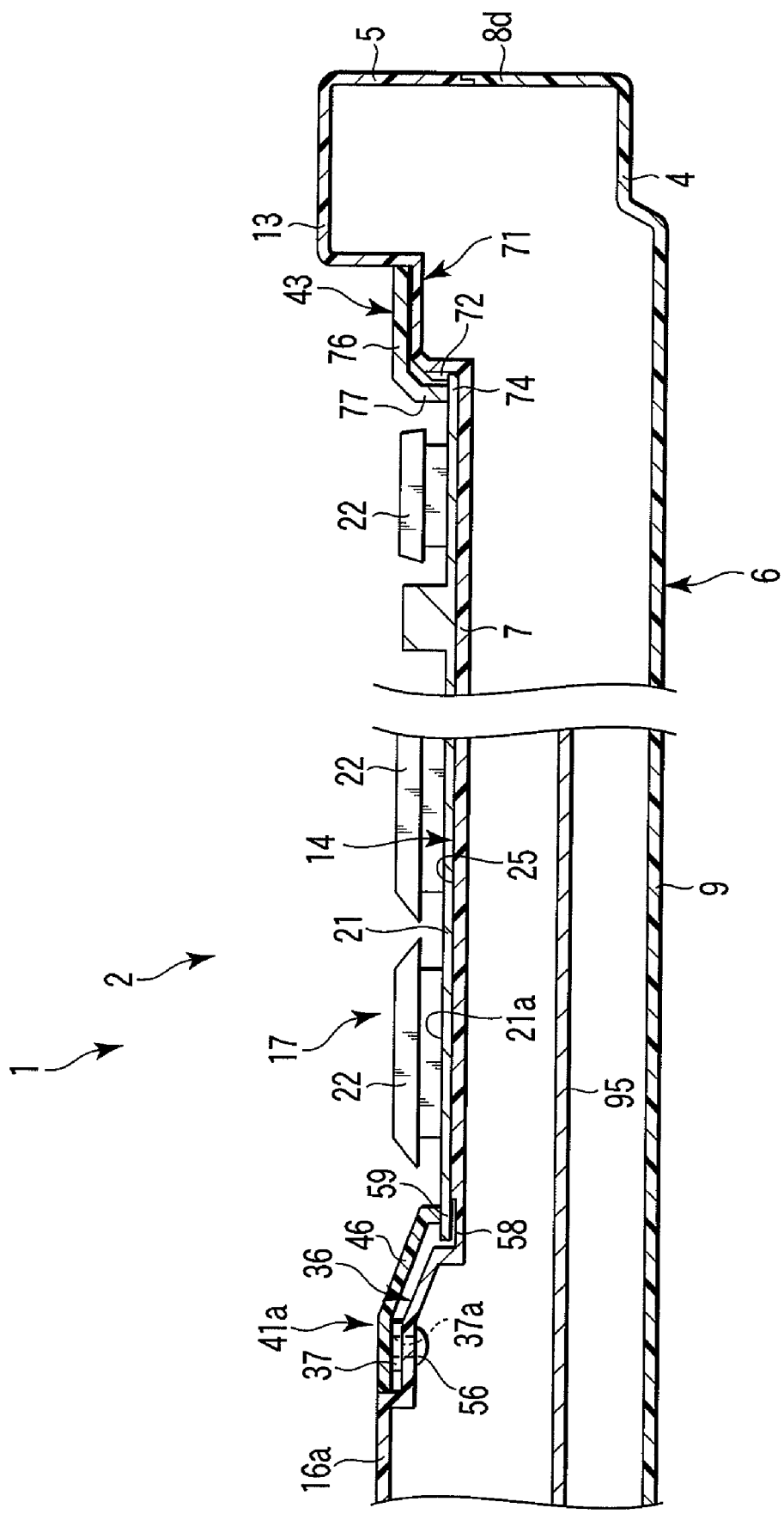
FIG. 10 is an exemplary cross-sectional view of the portable computer of the first embodiment, taken along line F10-F10 of FIG. 1.

The second portion 46 extends slantingly with respect to the first portion 45, to extend along the first holder placing portion 36 extending slantingly. A plurality of engaging projections 56 project downward from the second portion 46. As illustrated in FIG. 10, the engaging projections 56 are inserted through the respective second engaging holes 37a of the second engaging parts 37 provided in the first holder placing portion 36. Distal ends of the engaging projections 56 inserted through the second engaging holes 37a are welded to the housing 6 inside the housing 6. Thereby, the second portion 46 is fixed to the housing 6.

As illustrated in FIGS. 2 and 10, a plurality of recessed portions 58 are formed in an edge portion of the keyboard placing portion 14, which is adjacent to the first holder placing portion 36. A front end portion of the keyboard 17 has first hook portions 59 formed in positions corresponding to the first recessed portions 58. As illustrated in FIG. 10, the first hook portions 59 are inserted between the top wall 7 of the housing 6 and the second portions 46 of the frame members 41a and 41b, by using the first recessed portions 58. The second portions 46 of the frame members 41a and 41b hold down the first hook portions 59 of the keyboard 17 to the keyboard placing portion 14. The second portions 46 of the frame members 41a and 41b are an example of the first holder of the present invention.

Figure 8:
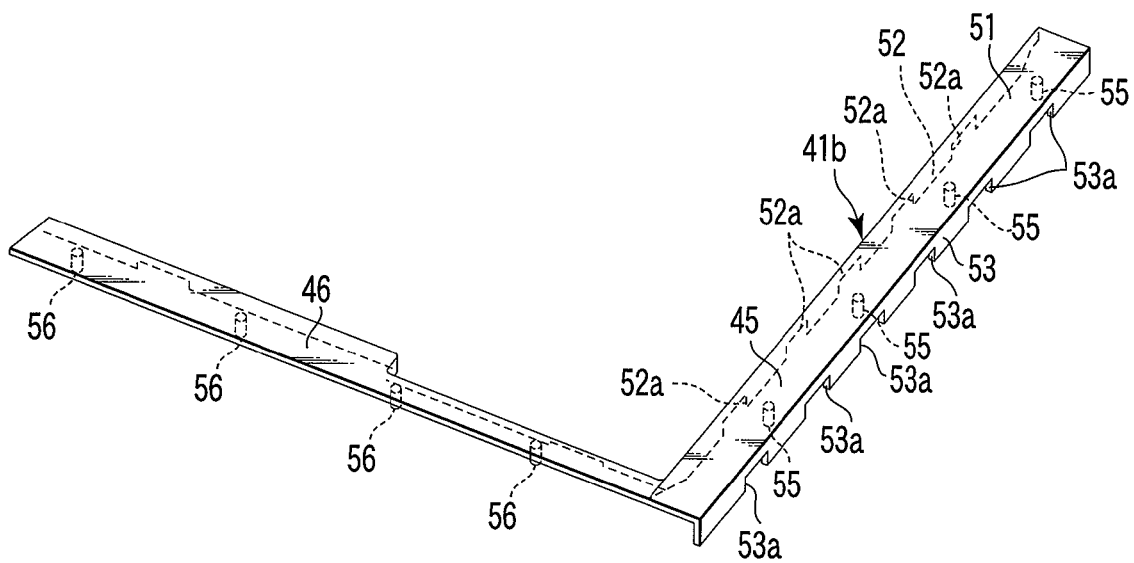
FIG. 8 is an exemplary perspective view of another frame member according to the first embodiment.

FIG. 8 illustrates the right frame member 41b. Like the left frame member 41a, the right frame member 41b also has a first portion 45 and a second portion 46. Therefore, it can be said that the portable computer 1 also has a liquid-guiding portion, which extends to the right sidewall portion 8c of the housing 6 while keeping the same height as that of the bottom surface 25 of the keyboard placing portion 14, in the right end portion of the keyboard placing portion 14.

Although the first and the second portions 45 and 46 are formed as one body in the left and the right frame members 41a and 41b of the first embodiment, the first and the second portions 45 and 46 may be formed separately. When the first and the second portions 45 and 46 are formed as one body as in the frame members 41a and 41b of the first embodiment, assembly property of the portable computer 1 is improved.

Figure 6:
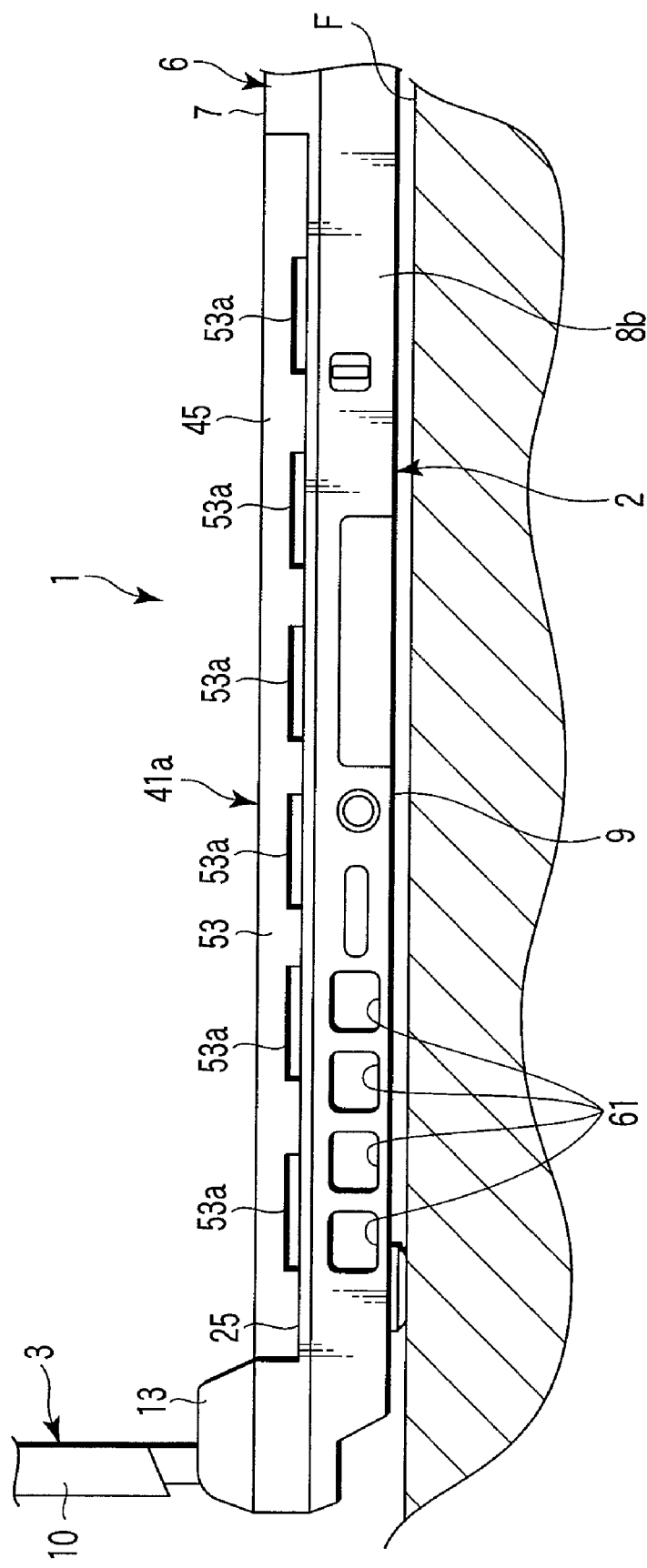
FIG. 6 is an exemplary side view of the portable computer according to the first embodiment.

As illustrated in FIG. 6, air outlets are opened in the left sidewall portion 8b of the housing 6. The air outlets 61 are positioned below the cut-off portions 53a formed in the second sidewall portion 53. As illustrated in FIG. 7, air inlets 62 are opened in the bottom wall 9 of the housing 6. Further, the housing 6 contains a cooling fan 63. The cooling fan 63 has air intake ports 63a which take in the air in the housing 6, and an air exhaust port 63b which exhausts the taken air. The air exhaust port 63b of the cooling fan 63 is opposed to the air outlets 61 formed in the housing 6.

On the other hand, as illustrated in FIG. 2, the projecting portion 13 is formed in the rear end portion of the top wall 7 of the housing 6. The projecting portion 13 projects upward from the top wall 7 of the housing 6, and is opposed to the display unit 3. The projecting portion 13 extends along the longitudinal direction of the housing 6. The projecting portion 13 has a pair of first depressed portions 65a and 65b. The depressed portions 65a and 65b cut off the projecting portion 13.

As illustrated in FIG. 1, a pair of leg portions 66a and 66b project from the lower end portion of the display housing 10 toward the housing 6. The leg portions 66a and 66b are part of the hinge parts 12a and 12b, respectively. The leg portions 66a and 66b are attached to the first depressed portions 65a and 65b, respectively, formed in the projecting portion 13. Each of the hinge parts 12a and 12b has a hinge device 67 including a hinge shaft. The hinge devices 67 are provided to extend between the projecting portion 13 of the housing 6 and the leg portions 66a and 66b of the display unit 3, and rotatably connect the display unit 3 to the housing 6.

As illustrated in FIG. 2, a second holder placing portion 71 is formed between the keyboard placing portion 14 and the projecting portion 13. The second holder placing portion 71 is raised higher than the keyboard placing portion 14. The second holder placing portion 71 has a plurality of second recessed portions 72 and a plurality of third engaging parts 73. The second recessed portions 72 are recessed from the front edge of the second holder placing portion 71 toward the rear of the housing 6.

Second hook portions 74 are formed in parts of the rear end portion of the keyboard 17, which correspond to the second recessed portions 72. The keyboard 17 is placed on the keyboard placing portion 14, with the second hook portions 74 fitted into the second recessed portions 72. As illustrated in FIG. 10, the keyboard holder 43 has an top wall portion 76 opposed to the upper surface of the second holder placing portion 71, a standing wall portion 77 extending from an edge of the top wall portion 76 toward the keyboard placing portion 14, and engaging projections 78 (FIG. 3) engaged with the third engaging parts 73.

When the keyboard holder 43 is placed on the second holder placing portion 71, the engaging projections 78 are engaged with the third engaging parts 73, and the keyboard holder 43 is fixed to the housing 6. When the keyboard holder 43 is placed on the second holder placing portion 71, a lower end of the standing wall portion 77 of the keyboard holder 43 abuts the second hook portions 74 of the keyboard 17 from above. Thereby, the keyboard 43 holds down the rear end portion of the keyboard 17 toward the keyboard placing portion 14. The keyboard holder 43 is an example of the second holder of the present invention. As described above, the keyboard 17 is held on the keyboard placing portion 14 by the second portions 46 of the left and the right frame members 41a and 41b and the keyboard holder 43.

Figure 11:
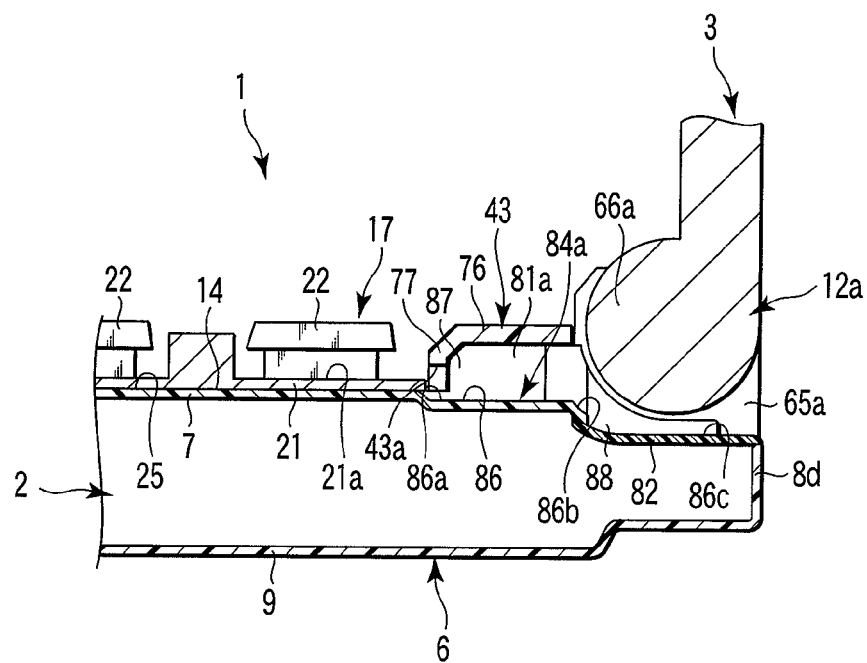
FIG. 11 is an exemplary cross-sectional view of the portable computer of the first embodiment, taken along line F11-F11 of FIG. 1.

As illustrated in FIG. 2, the second holder placing portion 71 has second depressed portions 81a and 81b in respective areas adjacent to the first depressed portions 65a and 65b, respectively. The depressed portions 81a and 81b cut off the second holder placing portion 71. As illustrated in FIG. 11, a hinge cap 82 which connects the housing cover 5 to the housing base 4 is attached to the rear end portion of the housing 6 positioned below the hinge parts 12a and 12b. The hinge cap 82 overlaps the end portion of the housing cover 5 from below, and forms a part of the top wall 7 of the housing 6.

As illustrated in FIG. 2, the top wall 7 is provided with rear end depressed portions 84a and 84b formed by the first depressed portions 65a and 65b, the second depressed portions 81a and 81b, and a part of the top wall 7 formed by the hinge cap 82. FIG. 5 illustrates the rear end depressed portion 84a formed in the left end portion of the housing 6, as a representative example. The right rear end depressed portion 84b has the same structure as the left rear end depressed portion 84a.

Each of the rear end depressed portions 84a and 84b has a bottom surface 86, and a standing wall 87 standing from a peripheral edge of the bottom surface 86. Edge portions of the rear end portions 84a and 84b, which are adjacent to the keyboard placing portion 14, are opened. Therefore, the bottom surfaces 86 of the rear end depressed portions 84a and 84b connect with the bottom surface 25 of the keyboard placing portion 14. The bottom surfaces 86 of the rear end depressed portions 84a and 84b communicate with the bottom surface 25 of the keyboard placing portion 14 along a direction perpendicular to the longitudinal direction of the keyboard placing portion 14. Further, each of the rear end depressed portions 84a and 84b has a cut-off portion 87a which cuts off a part of the standing wall 87 facing the rear of the housing 6.

As illustrated in FIG. 11, each of the bottom surfaces 86 of the rear end depressed portions 84a and 84b has a first bottom surface region 86a extending from the rear edge of the keyboard placing portion 14, a second bottom surface region 86b positioned below a front portion of the hinge part 12a or 12b, and a third bottom surface region 86c formed by the hinge cap 82. As illustrated in FIG. 5, a part of the first bottom surface region 86a extends into the keyboard placing portion 14. As illustrated in FIG. 11, the first bottom region 86a is located slightly lower than the bottom surface 25 of the keyboard placing portion 14.

The second bottom surface region 86b is lower than the first bottom surface region 86a, and the third bottom surface region 86c is lower than the second bottom surface region 86b. Specifically, the bottom surface 86 of the rear end depressed portions 84a and 84b are lower than the top surface 21a of the base 21 of the keyboard 17 placed on the keyboard placing portion 14. The rear edges of the bottom surfaces 86 of the rear end depressed portions 84a and 84b extend to the rear sidewall portion 8d of the housing 6. Ribs 88 extends from side edges of the cut-off portions 87a of the rear end depressed portions 84a and 84b toward the rear sidewall portion 8d of the housing 6.

As illustrated in FIGS. 3 and 11, the keyboard holder 43 has cut-off portions 43a in areas corresponding to the rear end depressed portions 84a and 84b. When the keyboard holder 43 is attached to the second holder placing portion 71, the cut-off portions 43a form gaps with the bottom surface 25 of the keyboard placing portion 14. As illustrated in FIG. 11, the keyboard placing portion 14 communicates with the side (more specifically, the rear side being one of the sides) of the housing 6 through the cut-off portions 43a of the keyboard holder 43 and the rear end depressed portions 84a and 84b. Therefore, it can be said that the rear end depressed portions 84a and 84b form liquid-guiding portions which extend from the bottom surface 25 of the keyboard placing portion 14 to the rear sidewall portion 8d of the housing 6.

As illustrated in FIG. 2, the keyboard placing portion 14 has a first and a second opening portions 91 and 92 opened to the inside of the housing 6. As illustrated in FIG. 9, an FFC 94 of the touchpad unit 33 extends into the housing 6 through the first opening portion 91. The housing 6 contains a main printed circuit board 95. The FFC 94 is electrically connected to the main printed circuit board 95. The first opening portion 91 is covered by a first lid 96. An example of the first lid 96 is a sheet metal member.

A sealing member 97 is interposed between the first lid 96 and the housing 6. Examples of the sealing member 97 are double faced adhensive tape and sponge rubber. The sealing member 97 is formed into a closed-loop surrounding the first opening portion 91. The sealing member 97 liquid-tightly seals a part surrounding the first opening portion 91. The sealing member 9 may be provided between the FFC 94 and the first lid 96, or between the housing 6 and the FFC 94. Further, sealing members 97 may be provided on and under the FFC 94.

As illustrated in FIG. 2, the second opening portion 92 is covered by a second lid 98. An example of the second lid 98 is a sheet metal member. Although it is not shown in detail, the FFC 23 of the keyboard 17 extends into the housing 6 through the second opening portion 92, and is electrically connected to the main printed circuit board 95. A sealing member 97 formed into a closed loop liquid-tightly seals a part surrounding the second opening portion 92.

Next, assembly of the portable computer 1 is explained.

First, the left and the right frame members 41a and 41b are attached to the top wall 7 of the housing 6. Specifically, the engaging projections 55 in the first portions 45 of the frame members 41a and 41b are inserted through the engaging holes 31a of the first engaging parts 31, and the engaging projections 56 of the second portions 46 are inserted through the engaging holes 37a of the second engaging parts 37. After the engaging projections 55 and 56 are inserted through the engaging holes 31a and 37a, respectively, the engaging projections 55 and 56 are welded inside the housing 6. Thereby, the frame members 41a and 41b are attached to the housing 6.

The touchpad part 15 is assembled before or after the frame members 41a and 41b are attached to the housing 6. Specifically, the FFC 94 of the touchpad unit 33 is inserted into the housing 6 through the first opening portion 91, and thereafter the first opening portion 91 is covered by the first lid 96. Since the sealing member 97 is interposed between the first lid 96 and the housing 6, the part surrounding the first opening portion 91 is liquid-tight.

After the frame members 41a and 41b are attached to the housing 6, the keyboard 17 is placed on the keyboard placing portion 14. Specifically, the FFC 23 of the keyboard 17 is inserted into the housing 6 through the second opening portion 92, and thereafter the second opening portion 92 is covered by the second lid 98. Since the sealing member 97 is interposed between the second lid 98 and the housing 6, the part surrounding the second opening portion 92 is liquid-tight. Thereafter, the first hook portions 59 of the keyboard 17 are inserted into the first recessed portions 58, and thereby the first hook portions 59 are interposed between the top wall 7 and the frame members 41a and 41b. Thereby, the front end portion of the keyboard 17 is supported by the frame members 41a and 41b from above.

After the first hook portions 59 are inserted under the frame members 41a and 41b, the keyboard 17 is placed on the keyboard placing portion 14, with the second hook portions 74 fitted into the second recessed portions 72. After the keyboard 17 is placed on the keyboard placing portion 14, the keyboard holder 43 is attached to the second holder placing portion 71. Thereby, the rear end portion of the keyboard 17 is supported by the standing wall portion 77 of the keyboard holder 43 from above. By the above steps, the keyboard 17 is fixed to the keyboard placing portion 14.

Next, operation of the portable computer 1 is explained.

Figure 12:
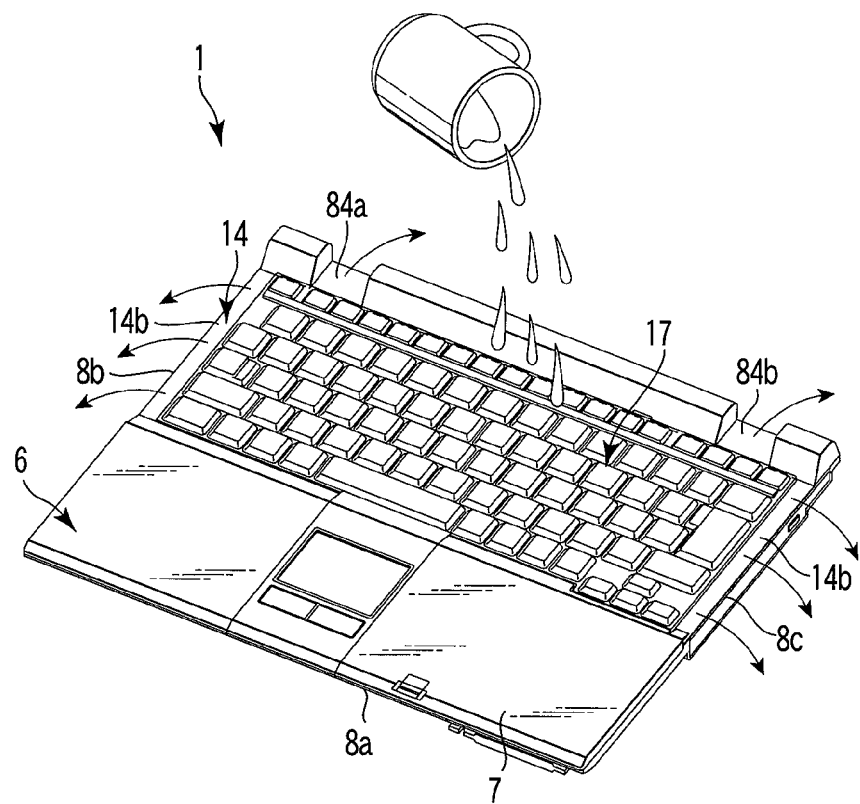
FIG. 12 is an exemplary schematic diagram of operation of the portable computer according to the first embodiment.
Figure 13:
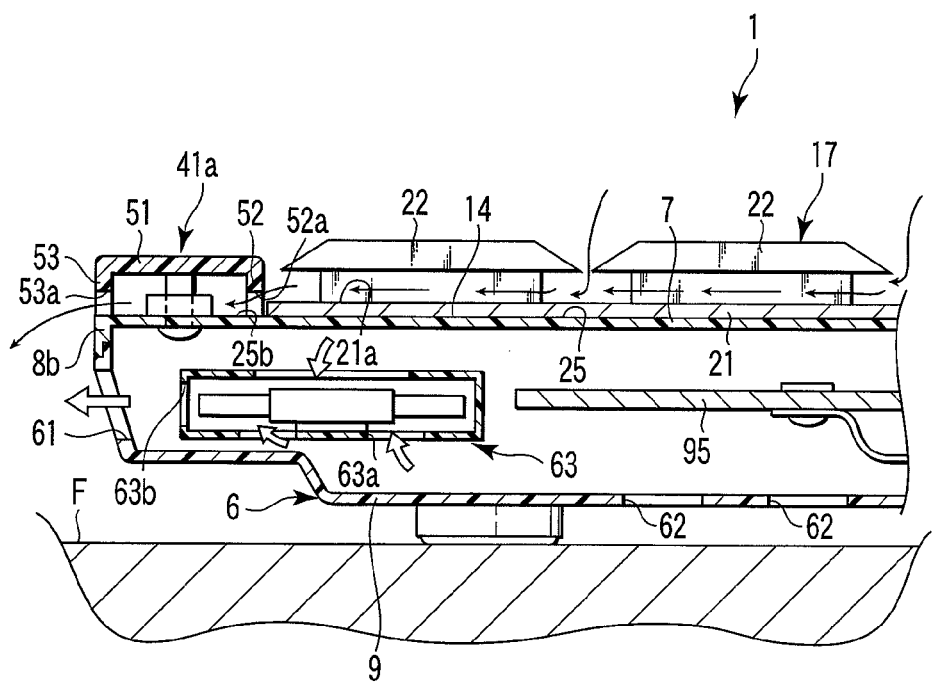
FIG. 13 is an exemplary cross-sectional view of the portable computer according to the first embodiment.

FIG. 12 is a schematic diagram of operation of the portable computer 1 according to the first embodiment. For example, if liquid such as coffee or water is accidentally spilled on the portable computer 1, the spilled liquid falls on the keyboard 17. As illustrated in FIG. 13, the liquid falling on the keyboard 17 flows on the base 21 of the keyboard 17.

A part of the liquid flowing on the base 21 of the keyboard 17 flows out of the keyboard 17 into the second regions 14b of the keyboard placing portion 14. The bottom surface 25 of the keyboard placing portion 14 extends to the left and the right edges of the housing 6. Further, the left and the right frame members 41a and 41b form gaps, which function as channels, with the bottom surface 25 of the keyboard placing portion 14. The liquid flowing into the second regions 14b is discharged to the sides of the housing 6, through the grooves formed in the frame members 41a and 41b.

As illustrated in FIG. 12, a part of the liquid flowing on the base 21 of the keyboard 17 flows into the rear end depressed portions 84a and 84b through the cut-off portions 43a of the keyboard holder 43. The liquid flowing into the rear end depressed portions 84a and 84b is guided by the standing walls 87 and the ribs 88 of the rear end depressed portions 84a and 84b, and discharged to the rear of the housing 6 through respective gaps between the bottom surfaces 86 of the rear end depressed portions 84a and 84b and the hinge parts 12a and 12b.

According to the portable computer 1 having the above structure, liquidproof property is improved. Specifically, since the bottom surface 25 of the keyboard placing portion 14 extends to the sidewall portions 8b and 8c, liquid spilled on the keyboard 17 does not remain in the keyboard placing portion 14, but is discharged from edges of the top wall 7 to the sides of the housing 6. Specifically, according to the portable computer 1 of the first embodiment, it is unnecessary to provide ducts extending from the keyboard placing portion to the bottom of the housing through the housing. Liquid spilled on the keyboard placing portion 14 is discharged from the top wall 7 of the housing 6 to the sides of the housing 6, without passing through the inside of the housing 6. Therefore, there is little possibility that the liquid leaks inside the housing 6, and thus the liquidproof property of the portable computer 1 is improved.

Further, according to the portable computer 1 of the first embodiment, it is unnecessary to provide a drain mechanism such as ducts, and thus the space in the housing 6 can be effectively used. This contributes to downsizing and increase in flexibility of design of the portable computer 1. Further, since it is unnecessary to provide mechanisms such as ducts, the structure of the housing 6 is simplified. This contributes to reduction in manufacturing cost of the portable computer 1.

Since the second region 14b of the keyboard placing portion 14 is lower than the top surface 21a of the base 21 of the keyboard 17, liquid spilled on the base 21 is spontaneously discharged to the side of the housing 6. Specifically, spilled liquid is hard to remain in the keyboard placing portion 14, and liquid is easily discharged in a short time. This shortens the time necessary for the portable computer 1 to dry, and thus the portable computer 1 which has got wet becomes usable again in a short time.

Since the frame members 41a and 41b are attached to the second regions 14b, the height of the top surface of the main body 2 formed by the keyboard 17, the palm rest portions 16a and 16b, the touchpad part 15 and the frame members 41a and 41b is made substantially uniform. This enhances the appearance of the portable computer 1. Specifically, the appearance of the portable computer 1 is improved by attaching the frame members 41a and 41b also functioning as decorative members.

The frame members 41a and 41b form gaps, which function as channels, with the bottom surface 25 of the keyboard placing portion 14. Therefore, even when the frame members 41*a* and 41*b* are attached to the keyboard placing portion 14, liquid flowing on the bottom surface 25 of the keyboard placing portion 14 reaches the sides of the housing 6 through the above gaps. Specifically, the frame members 41*a* and 41*b* hardly deteriorate the drainage capability of the portable computer 1.

It suffices that the bottom surface 25 of the keyboard placing portion 14 extends to at least one of the sidewall portions 8*a*, 8*b*, 8*c* and 8*d*. The bottom surface 25 of the keyboard placing portion 14 according to the first embodiment extends to the left and the right sidewall portions 8*b* and 8*c* corresponding to the longitudinal end portions of the keyboard placing portion 14. Since the bottom surface 25 of the keyboard placing portion 14 extends from the central portion of the keyboard placing portion 14 to two or more different sidewall portions 8*b* and 8*c* as in the first embodiment, spilled liquid is discharged through various routes, and the drainage capability of the portable computer 1 is further improved.

Since there is other bottom surface 86 which communicates with the bottom surface 25 of the keyboard placing portion 14 and extends to the sidewall portion 8*d* of the housing 6 along the direction perpendicular to the longitudinal direction of the keyboard placing portion 14, the variety of the discharge routes of spilled liquid is further increased. Specifically, in the first embodiment, liquid can be discharged in three directions, that is, to the left, the right, and the rear of the keyboard 17. Therefore, the drainage capability is further improved.

Further, since the height of the bottom surface 86 is the same as, or lower than, the height of the top surface 21*a* of the base 21 of the keyboard 17, liquid spilled on the base 21 is spontaneously discharged to the side of the housing 6, and thus the drainage capability is further improved.

The bottom surfaces 86 according to the first embodiment are formed in the depressed portions 65*a* and 65*b* to which the hinge parts 12*a* and 12*b* is attached. The depressed portions 65*a* and 65*b* is depressed to receive the hinge parts 12*a* and 12*b*. By using the depressed portion, the height of the bottom surface 86 is easily set to be the same as or lower than the top surface 21*a* of the base 21 of the keyboard 17, without specially providing cut-off portions or grooves in the projecting portion 13.

Recent portable computers generally have air inlets for taking in the outside air into the housing in the bottom wall of the housing. For example, if liquid remained in the keyboard placing portion is discharged below the housing through ducts or the like, the liquid discharged below the housing may enter the housing again through air inlets with air intake by the cooling fan.

On the other hand, in the portable computer 1 according to the first embodiment, the liquid remained in the keyboard placing portion 14 is discharged to the sides of the housing 6. Therefore, there is little possibility that the liquid enters the housing 6 through the air inlets 62 provided in the bottom wall 9 of the housing 6. This contributes to improved liquidproof property of the portable computer 1.

Since the air outlet 61 is formed in the sidewall portion 8*b* of the housing 6, the air emitted from the cooling fan 63 is discharged to the outside of the housing 6 through the air outlet 61. As illustrated in FIG. 13, liquid to be discharged to the side of the housing 6 is fanned away by the air discharged from the air outlet 61, and discharged away from the housing 6. This further reduces the possibility that the liquid enters the housing 6 through the air outlet 61 or the air inlet 62 formed in the housing 6.

Since the front and the rear end portions of the keyboard 17 are fixed to the housing 6 by the frame members 41*a* and 41*b* and the keyboard holder 43, it is unnecessary to fix the left and right side end portions of the keyboard 17. Specifically, it is unnecessary to provide engaging holes or recessed portions on the left and the right sides of the keyboard 17 to fix the keyboard 17. Since such engaging holes are omitted, the bottom surface 25 of the keyboard placing portion 14 is formed flatter, and the drainage capability is further improved.

Since the cut-off portions 52*a* in the first sidewall portions 52 of the left and the right frame members 41*a* and 41*b* are opposed to respective the gaps between keys 22 of the keyboard 17, the liquid drainage capability is improved. Specifically, liquid spilled on the keyboard 17 flows between the keys 22 by capillarity. Therefore, since the cut-off portion 52*a* is formed in position opposed to the gap between adjacent keys 22, the liquid which has reached the frame members 41*a* and 41*b* after flowing between the keys 22 directly flows under the frame members 41*a* and 41*b* through the cut-off portion 52*a*. This improves the drainage capability of the portable computer.

Since the cut-off portions 52*a* in the first sidewall portions 52 of the left and the right frame members 41*a* and 41*b* are shifted from the cut-off portions 53*a* of the second sidewall portions 53, the keyboard 17 does not come within the sight of the user when the user views the side surfaces of the housing 6. This contributes to improvement of the appearance of the portable computer 1. Since the cut-off portions 52*a* and 53*a* are provided in the lower end portions of the frame members 41*a* and 41*b*, the cut-off portions 52*a* and 53*a* are inconspicuous when the main body 2 is viewed from above, and thus the appearance of the portable computer 1 is improved.

For example, since the ribs 88 are provided on the rear end depressed portions 84*a* and 84*b*, liquid flowing in the rear end depressed portions 84*a* and 84*b* is guided in a certain direction. As illustrated in FIG. 5, if a functional component 99 is provided in the rear sidewall portion 8*d* of the housing 6, the ribs 88 guides the liquid flowing in the rear end depressed portions 84*a* and 84*b* to flow in a direction avoiding the functional component 99. This contributes to improvement in the liquidproof property of the portable computer 1. An example of the functional component 99 is a connector.

Figure 14:
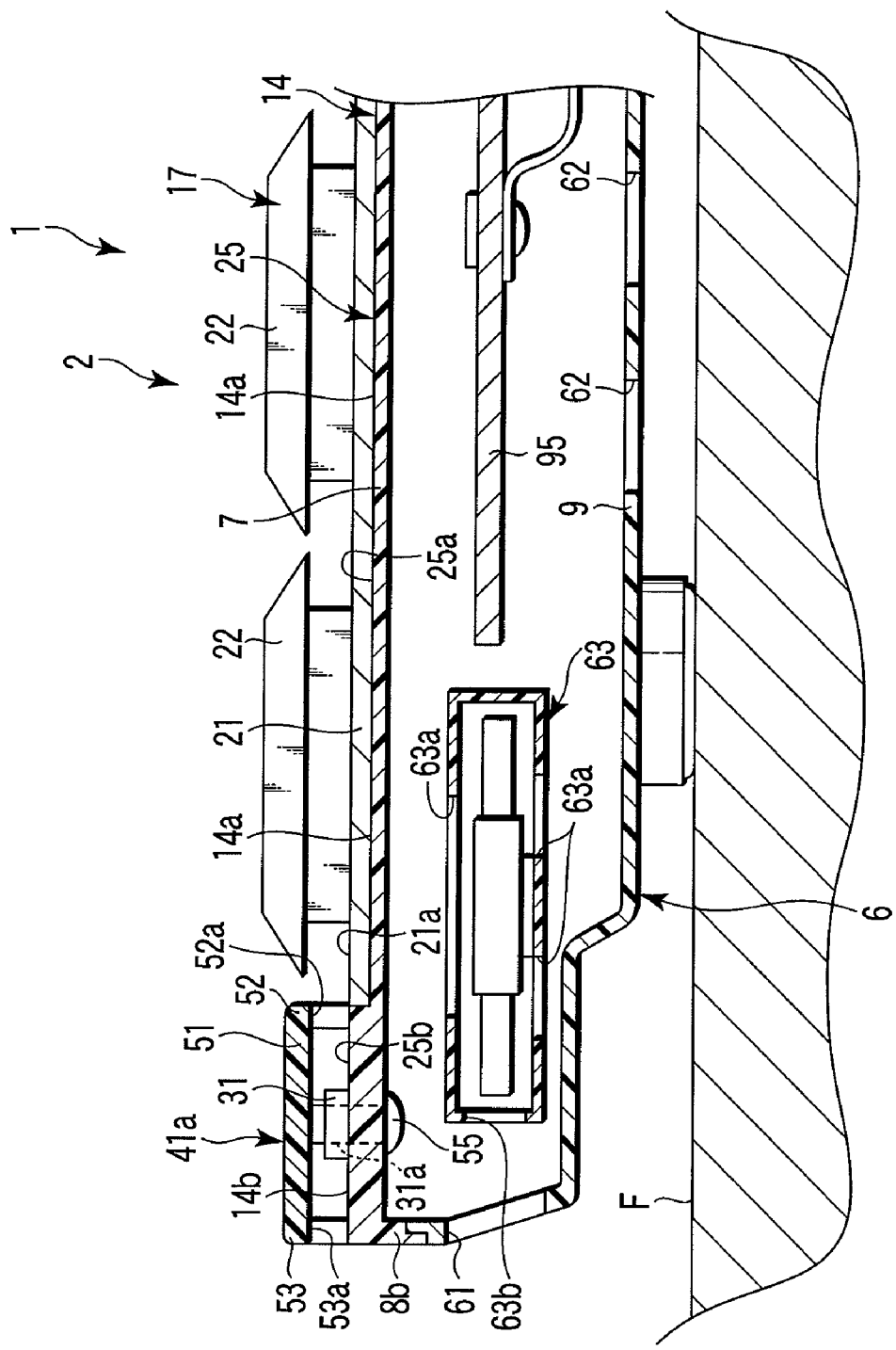
FIG. 14 is an exemplary cross-sectional view of a modification of the portable computer according to the first embodiment.

FIG. 14 illustrates a modification of the portable computer 1 according to the first embodiment. As illustrated in FIG. 14, the bottom surfaces 25*b* of the second regions 14*b* of the keyboard placing portion 14 may be formed as high as the top surface 21*a* of the base 21 of the keyboard 17 placed on the first region 14*a*. Specifically, the bottom surfaces 25*b* of the second regions 14*b* may be set higher than the bottom surface 25*a* of the first region 14*a* by the thickness of the base 21 of the keyboard 17. Since liquid spilled on the keyboard 17 flows on the top surface 21*a* of the base 21, the spilled liquid flows from the top surface 21*a* of the base 21 into the second regions 14*b* and is spontaneously discharged to the sides of the housing 6, as long as the second regions 14*b* is not higher than the top surface 21*a* of the base 21. Therefore, the modification also has a good liquid drainage capability.

Specifically, even when the bottom surfaces 25*b* of the second regions 14*b* of the keyboard placing portion 14 have the same height as that of the top surface 21*a* of the base 21 of the keyboard 17, a sufficient liquid drainage effect is achieved. If the bottom surface 25*b* of the second region 14 is lower than the top surface 21*a* of the base 21, liquid drainage is easily promoted. In all the embodiments described below, the bottom surfaces 25*b* of the second regions 14*b* may have the same height as the top surface 21*a* of the base 21 of the keyboard 17 placed on the first region 14*a*. Even if the bottom surfaces 25*b* of the second regions 14*b* are slightly higher than the top surface 21a of the base 21 of the keyboard 17, some liquid drainage capability is expected, as long as the bottom surface 25 of the keyboard placing portion 14 extends to at least one of the sidewall portions 8b and 8c of the housing 6.

Figure 15:
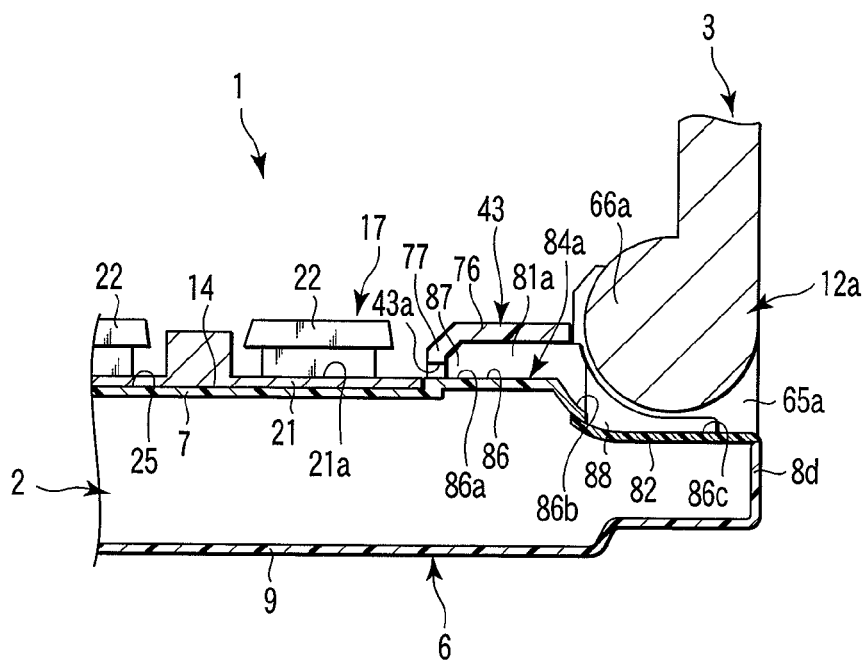
FIG. 15 is an exemplary cross-sectional view of another modification of the portable computer according to the first embodiment.

In the same manner, the bottom surfaces 86 of the rear end depressed portions 84a and 84b may have the same height as the top surface 21a of the base 21 of the keyboard 17 (FIG. 15). Specifically, even when the bottom surfaces 86 of the rear end depressed portions 84a and 84b are higher than the bottom surface 25a of the first region 14a by the thickness of the base 21 of the keyboard 17, the rear end depressed portions 84a and 84b can exhibit a sufficient liquid drainage effect. Although the rear end depressed portions 84a and 84b of the first embodiment have three bottom surface regions 86a, 86b and 86c having different heights, the rear end depressed portions 84a and 84b may extend flat to the sides of the housing 6. The rear end depressed portions 84a and 84b may be formed in regions different from the regions below the hinge parts 12a and 12b. For example, the frame members 41a and 41b may be omitted. The portable computer 1 can exhibit the liquidproof capability even without the frame members 41a and 41b.

Next, a portable computer 101 serving as an electronic apparatus according to a second embodiment of the present invention is described with reference to FIGS. 16 and 17. Constituent elements thereof having the same functions as those of the portable computer 1 according to the first embodiment are denoted by the same respective reference numerals, and explanations thereof are omitted. The portable computer 101 has a frame member 102 which is different from the frame members 41a and 41b according to the first embodiment. The portable computer 101 is the same as the portable computer 1 except the above point.

Figure 16:
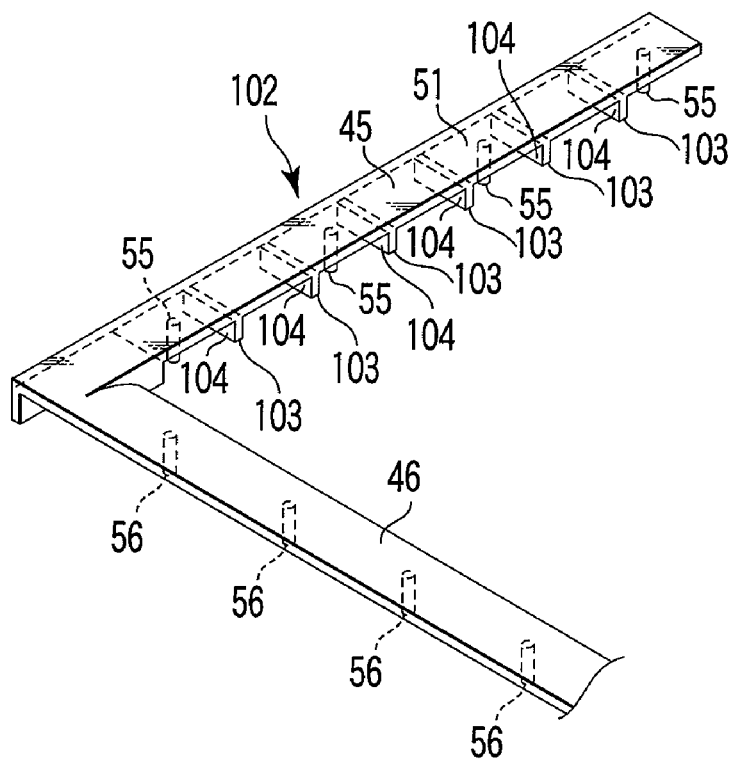
FIG. 16 is an exemplary perspective view of a frame member according to a second embodiment of the present invention.
Figure 17:
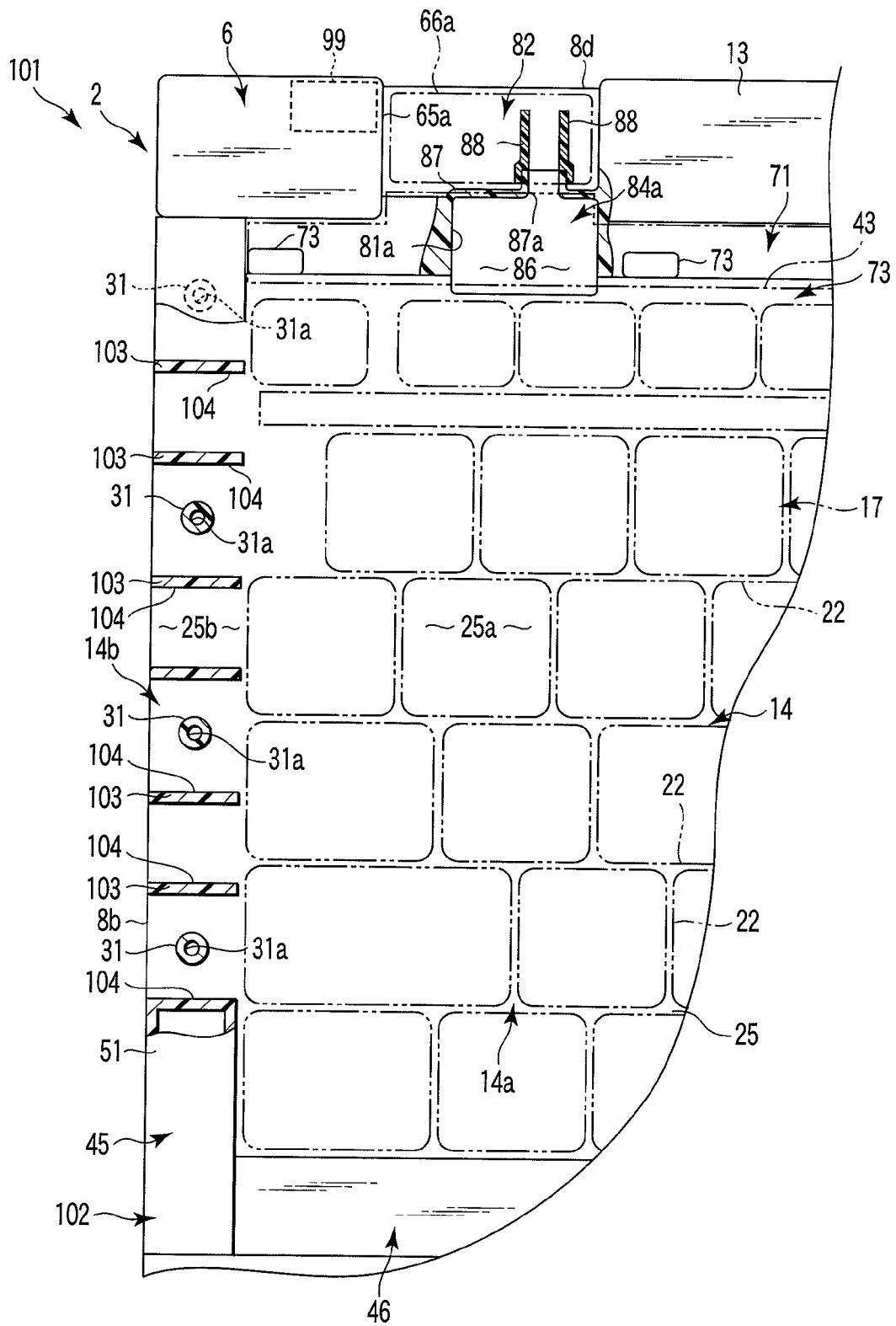
FIG. 17 is an exemplary plan view of a portable computer according to the second embodiment, including a cross section of a part of the portable computer.

FIG. 16 illustrates the frame member 102 according to the second embodiment. FIG. 16 illustrates a left frame member. Since a right frame member thereof has almost the same structure as that of the left frame member, explanation thereof is omitted.

The frame member 102 has a first portion 45 and a second portion 46. The first portion 45 has a ceiling wall portion 51 and a plurality of leg portions 103. The ceiling wall portion 51 forms a gap between the frame member 102 and the bottom surface 25b of the second region 14b. The leg portions 103 project from the ceiling wall portion 51 toward the housing 6. In other words, the frame member 102 has groove portions 104 formed between adjacent leg portions 103.

When the frame member 102 is attached to the top wall 7 of the housing 6, distal ends of the leg portions 103 abut the bottom surface 25b of the second region 14b. As illustrated in FIG. 17, when the frame member 102 is attached to the top wall 7 of the housing 6, the groove portions 104 form respective gaps between groove portions 104 and the bottom surface 25 of the keyboard placing portion 14. The keyboard placing portion 14 communicates with the sides of the housing 6 through the groove portions 104. The groove portions 104 of the frame member 102 are formed in positions opposed to respective gaps between adjacent keys 22 of the keyboard 17.

According to the portable computer 101 having the above structure, the liquidproof capability is improved. Specifically, since the keyboard placing portion 14 extends to the sidewall portions 8b and 8c, liquid spilled on the keyboard 17 is discharged from edges of the top wall 7 to the sides of the housing 6, without remaining in the keyboard placing portion 14. Therefore, there is little possibility that liquid leaks in the housing 6, and thus liquidproof property of the portable computer 101 is improved.

Since the frame members 102 are attached to the second regions 14b, the appearance of the portable computer 101 is improved for the same reason as in the first embodiment. Even when the frame members 102 are attached to the keyboard placing portion 14, liquid flowing on the bottom surface 25 of the keyboard placing portion 14 reaches the sides of the housing 6 through the groove portions 104. Specifically, the frame members 102 hardly deteriorate the liquid drainage capability of the portable computer 101.

Since the groove portion 104 of the frame member 102 is opposed to the respective the gap between adjacent keys 22 of the keyboard 17, the liquid drainage capability is improved for the same reason as described in the first embodiment.

The structure and the shape of the left and the right frame members are not limited to specific ones, as long as they do not obstruct the flow of liquid flowing from the keyboard 17 toward edges of the top wall 7. For example, a gap may be formed between the frame member and the bottom surface of the keyboard placing portion, by lifting and supporting the frame member having a plate shape by projections projecting from the bottom surface of the keyboard placing portion 14.

Figure 18:
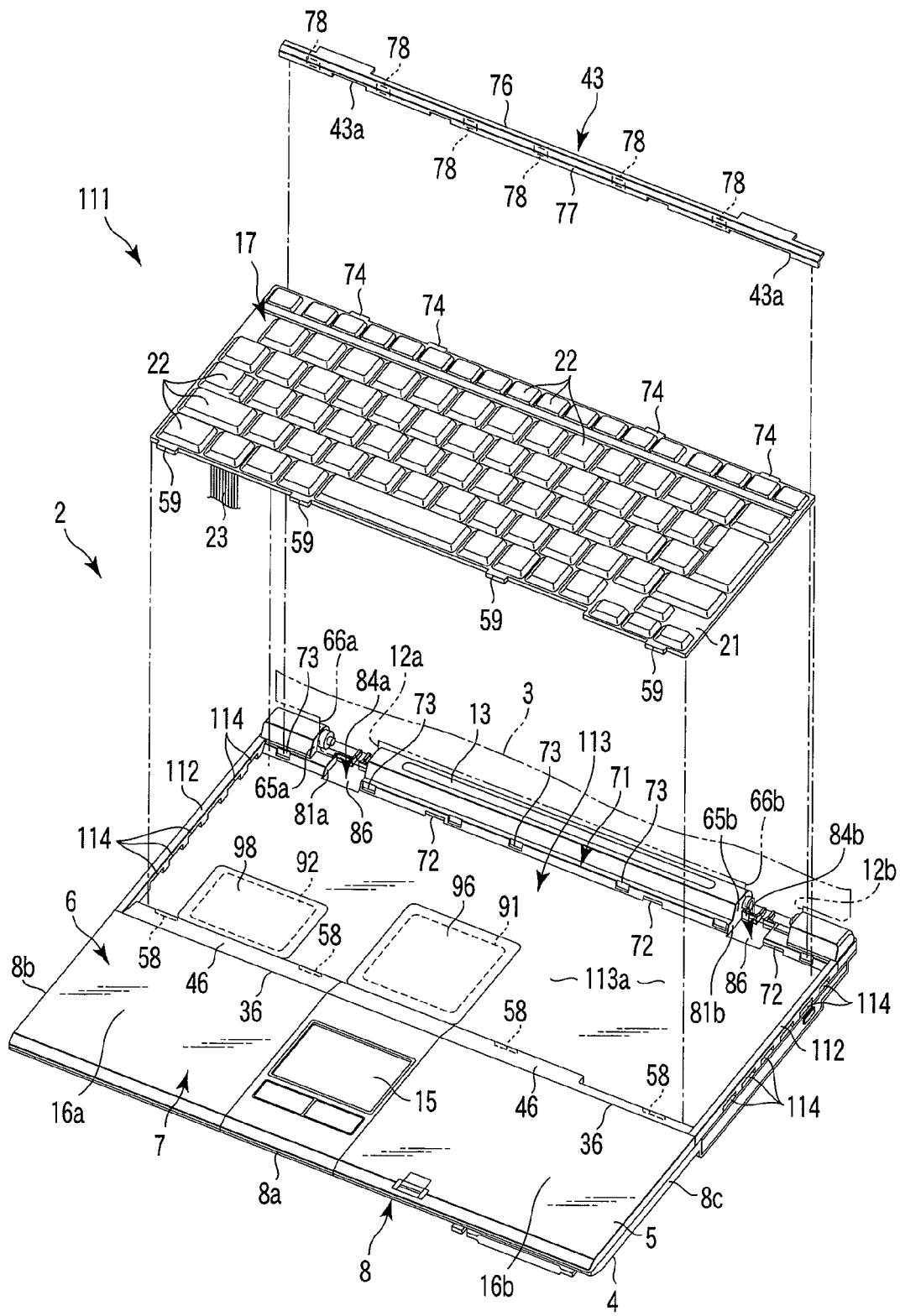
FIG. 18 is an exemplary perspective view of a portable computer according to a third embodiment of the present invention.

Next, a portable computer 111 serving as an electronic apparatus according to a third embodiment of the present invention is described with reference to FIGS. 18 and 19. Constituent elements thereof having the same functions as those of the portable computer 1 according to the first embodiment are denoted by the same respective reference numerals, and explanations thereof are omitted. The portable computer 111 has a frame portion 112 which is united as one body with the housing 6, instead of the frame members 41a and 41b according to the first embodiment. The portable computer 111 is the same as the portable computer 1 except for the above point.

The keyboard placing portion 113 has a bottom surface 113a formed in the top wall 7 of the housing 6. The keyboard placing portion 113 according to the third embodiment does not reach the left edge or the right edge of the top wall 7. As illustrated in FIGS. 18 and 19, a frame portion 112 stands upward between the keyboard placing portion 113 and the left sidewall portion 8b of the housing 6, and between the keyboard placing portion 113 and the right sidewall portion 8c of the housing 6. The frame portion 112 is united with the top wall 7 of the housing 6. The frame portion 112 has a plurality of holes 114 penetrating in an extending direction of the bottom surface 113a of the keyboard placing portion 113, for example.

As illustrated in FIG. 19, the holes 114 penetrate the frame portion 112 along the extending direction of the bottom surface 113a of the keyboard placing portion 113. An example of the height of the lower ends 114a of inner surfaces of the holes 114 is lower than the height of the top surface 21a of the base 21 of the keyboard 17 placed on the keyboard placing portion 113. The lower ends 114a of the holes 114 according to the third embodiment is as high as the bottom surface 113a of the keyboard placing portion 113, and lower than the top surface 21a of the base 21 placed on the keyboard placing portion 113. The holes 114 of the frame portion 112 are formed in positions opposed to respective gaps between adjacent keys 22 of the keyboard 17. As illustrated in FIG. 19, air outlets 61 opposed to a cooling fan 63 are formed in the sidewall portion 8b of the housing 6.

Figure 20:
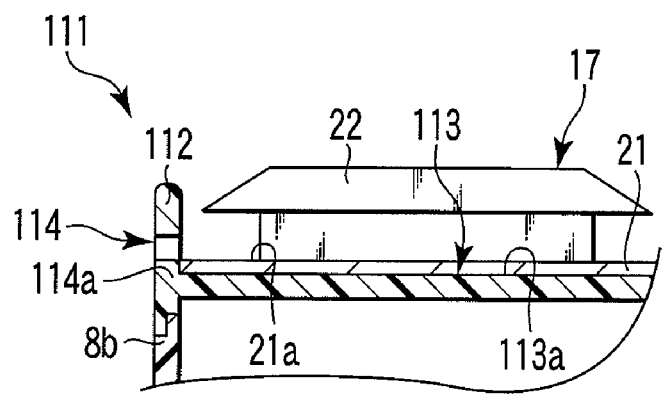
FIG. 20 is an exemplary cross-sectional view of a modification of the portable computer according to the third embodiment.

FIG. 20 illustrates a modification of the portable computer 111. As illustrated in FIG. 20, the height of the lower ends 114a of the holes 114 may be the same as the height of the top surface 21a of the base 21 placed on the keyboard placing portion 113. The height of the bottom surfaces 86 of the rear end depressed portions 84a and 84b may be the same as, or lower than, the height of the top surface 21a of the base 21 of the keyboard 17.

According to the portable computer 111 having the above structure, the liquidproof property is improved. Specifically, since the frame portion 112 has the hole 114, liquid spilled on the keyboard 17 is discharged to the side of the housing 6 through the hole 114 of the frame portion 112, without remaining in the keyboard placing portion 113. Therefore, there is little possibility that liquid leaks in the housing 6, and thus the liquidproof property of the portable computer 111 is improved.

Since the frame portion 112 is provided, the top surface of the main body 2, which is formed of the keyboard 17, the palm rest portions 16a and 16b, the touchpad part 15 and the frame portion 112, is almost even. This improves the appearance of the portable computer 111.

Since the lower end 114a of the inner surface of the hole 114 is lower than the top surface 21a of the base 21 of the keyboard 17, liquid spilled on the base 21 is spontaneously discharged to the sides of the housing 6. As illustrated in FIG. 21, the lower ends 114a of the holes 114 may be lower than the bottom surface 113a of the keyboard placing portion 113. As illustrated in FIG. 22, the holes 114 may be inclined to be gradually lowered toward the outside of the housing 6. According to the holes 114 illustrated in FIG. 21 or 22, the liquid drainage capability is improved. However, even if the lower end 114a of the hole 114 is slightly higher than the top surface 21a of the base 21, some liquid drainage capability is expected, as long as the hole 114 is formed in the frame portion 112.

Since the hole 114 of the frame portion 112 is opposed to the gap between adjacent keys 22 of the keyboard 17, the liquid drainage capability is improved for the same reason as that of the portable computer 1 according to the first embodiment. Since the air outlet opposed to the cooling fan 63 is formed in the sidewall portion 8b of the housing 6, the liquidproof property is improved for the same reason as that of the portable computer 1 according to the first embodiment.

Figure 24:
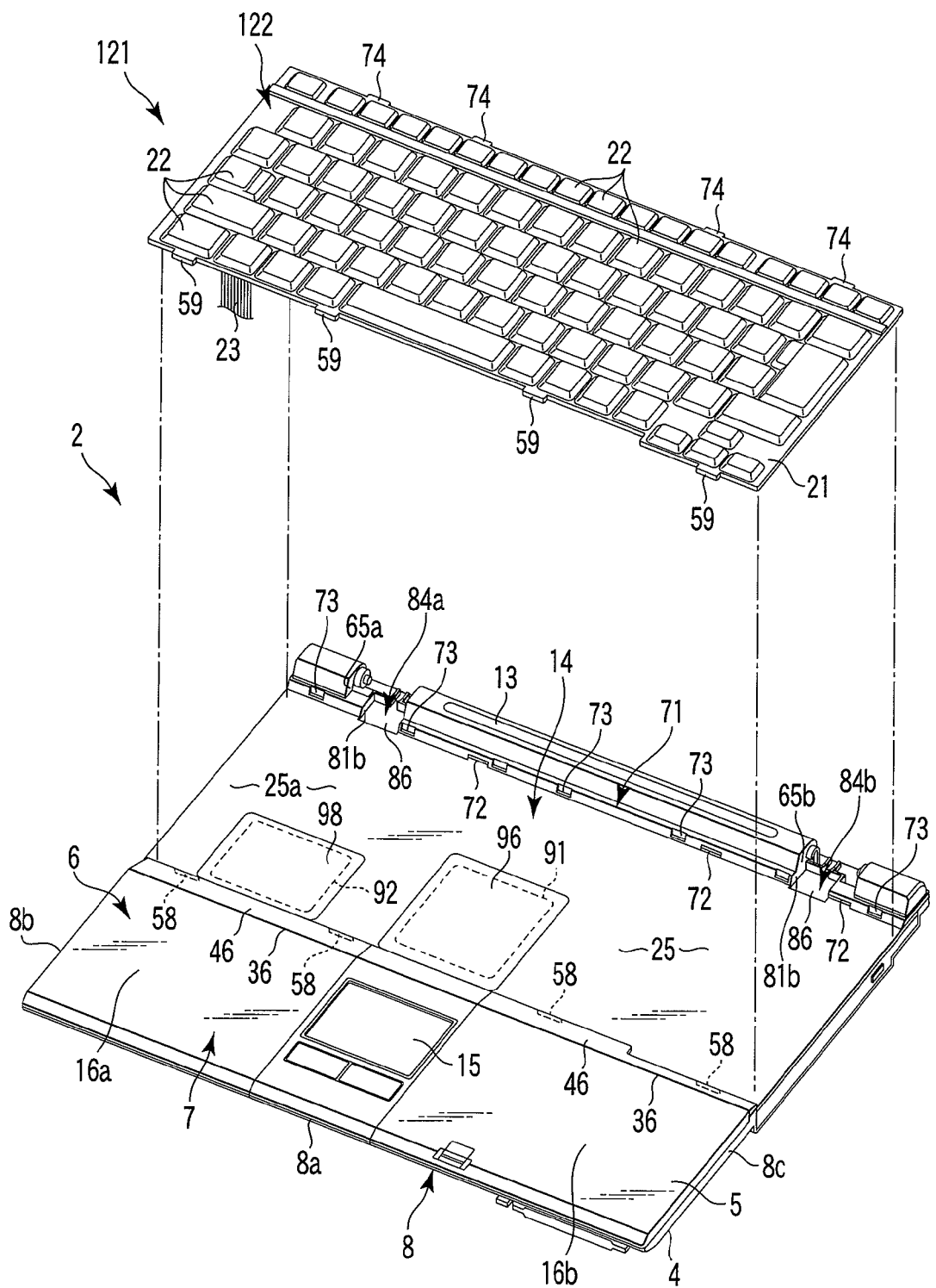
FIG. 24 is an exemplary partly exploded perspective view of the portable computer according to the fourth embodiment.

Next, a portable computer 121 serving as an electronic apparatus according to a fourth embodiment of the present invention is described with reference to FIGS. 23 and 24. Constituent elements thereof having the same functions as those of the portable computer 1 according to the first embodiment are denoted by the same respective reference numerals, and explanations thereof are omitted. The portable computer 121 does not have left and right frame members 41a and 41b.

A longitudinal dimension of a keyboard 122 according to the fourth embodiment is almost the same as the longitudinal dimension of the top wall 7 of the housing 6. Specifically, when the keyboard 122 is placed on the keyboard placing portion 14, edges of the keyboard 122 reach the left and the right sidewall portions 8b and 8c of the housing 6.

According to the portable computer 121 having the above structure, the liquidproof property is improved. Specifically, since the keyboard placing portion 14 extends to the sidewall portions 8b and 8c, liquid spilled on the keyboard 17 is discharged from edges of the top wall 7 to the sides of the housing 6, without remaining in the keyboard placing portion 14. Therefore, there is little possibility that liquid leaks in the housing 6, and thus liquidproof property of the portable computer 121 is improved.

Since the edges of the keyboard 122 reaches the left and the right sidewall portions 8b and 8c of the housing 6, it is unnecessary to provide frame members 41a and 41b or frame portion 112, and thus the shape of the housing 6 is simplified. This contributes to reduction in manufacturing cost of the portable computer 121.

Next, a portable computer 131 serving as an electronic apparatus according to a fifth embodiment of the present invention is described with reference to FIGS. 25 to 27. Constituent elements thereof having the same functions as those of the portable computer 1 according to the first embodiment are denoted by the same respective reference numerals, and explanations thereof are omitted.

A touchpad placing portion 132 has a bottom surface 132a formed in the top wall 7 of the housing 6. As illustrated in FIGS. 25 and 26, a bottom surface 132a of the touchpad placing portion 132 connects with the bottom surface 25 of the keyboard placing portion 14, and is positioned on the same plane as the bottom surface 25 of the keyboard placing portion 14. Specifically, the height of the bottom surface 132a of the touchpad placing portion 132 is lower than the height of the top surface 21a of the base 21 of the keyboard 17 placed on the keyboard placing portion 14.

Figure 28:
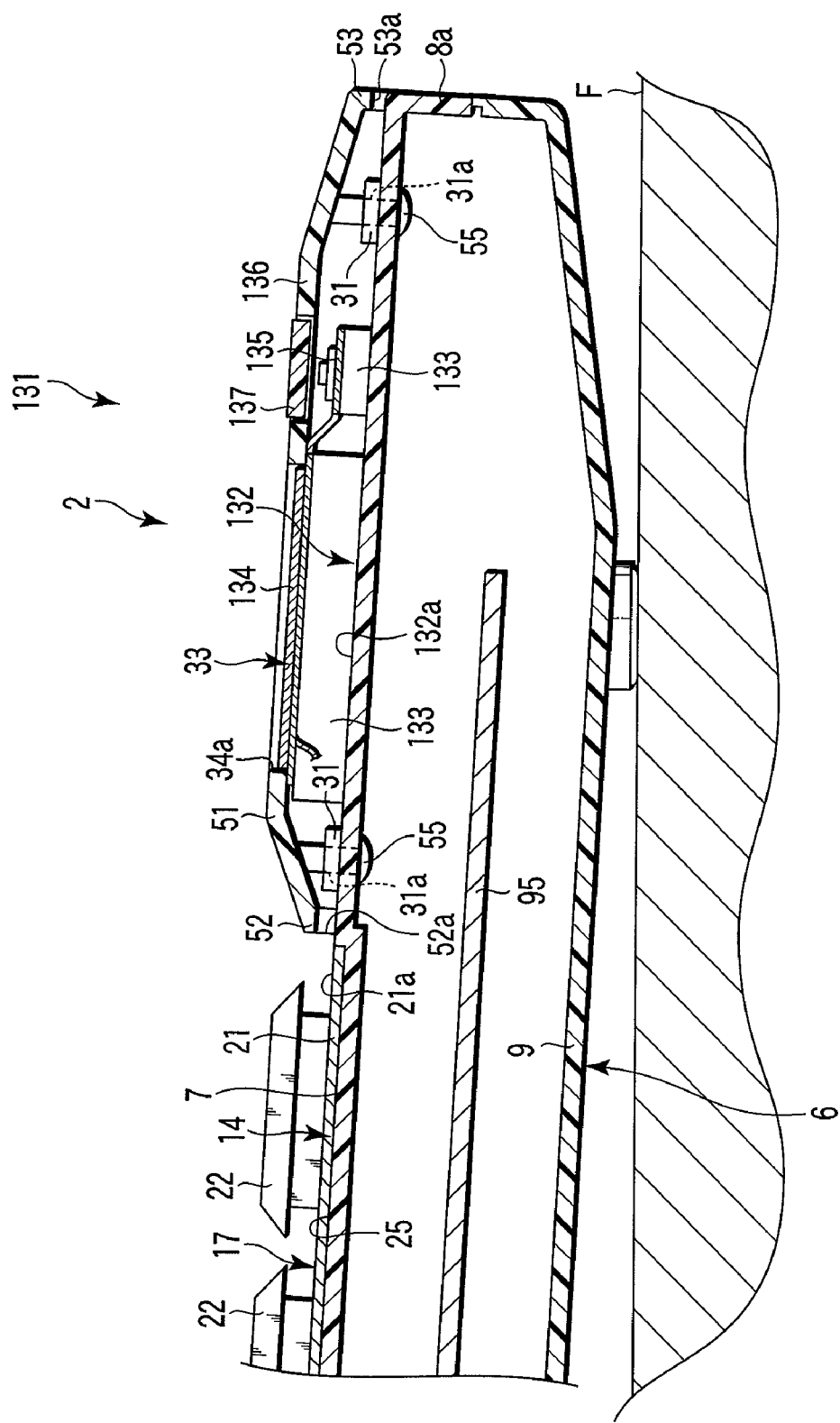
FIG. 28 is an exemplary cross-sectional view of a modification of the portable computer according to the fifth embodiment.

As in a modification illustrated in FIG. 28, the height of the bottom surface 132a of the touchpad placing portion 132 may be the same as the height of the top surface 21a of the base 21 of the keyboard 17 placed on the keyboard placing portion 14.

Since the bottom surface 132a of the touchpad placing portion 132 is as high as or lower than the top surface 21a of the base 21 of the keyboard 17 placed on the keyboard placing portion 14, the portable computer 131 has an improved liquidproof property.

The bottom surface 132a of the touchpad placing portion 132 extends from a front edge of the keyboard placing portion 14 to the front sidewall portion 8a of the housing 6. A plurality of ribs 133 stand upward from the bottom surface 132a of the touchpad placing portion 132. The ribs 133 extend along a direction from the keyboard placing portion 14 to the front sidewall portion 8a of the housing 6.

Figure 26:
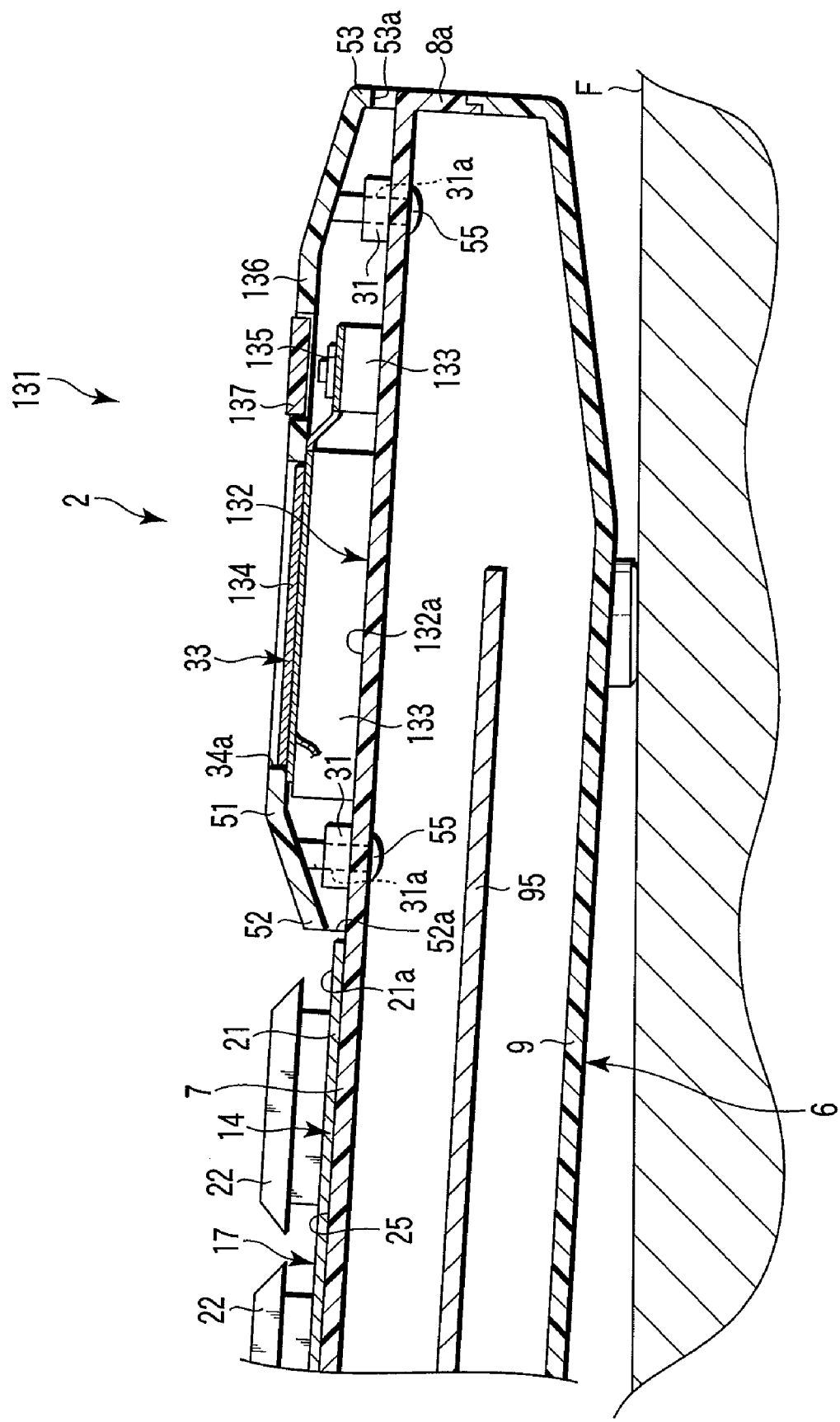
FIG. 26 is an exemplary cross-sectional view of a part of the portable computer of the fifth embodiment, including a touchpad placing portion.

As illustrated in FIG. 26, a touchpad unit 33 is mounted on the ribs 133. The touchpad unit 33 has a touchpad 134 being a pointing device, and a switch board portion 135 on which a click switch is mounted. A touchpad cover 136 is attached to the touchpad placing portion 132 to cover the touchpad unit 33. The touchpad cover 136 is provided with a push button 137 opposed to the switch board portion 135.

Figure 25:
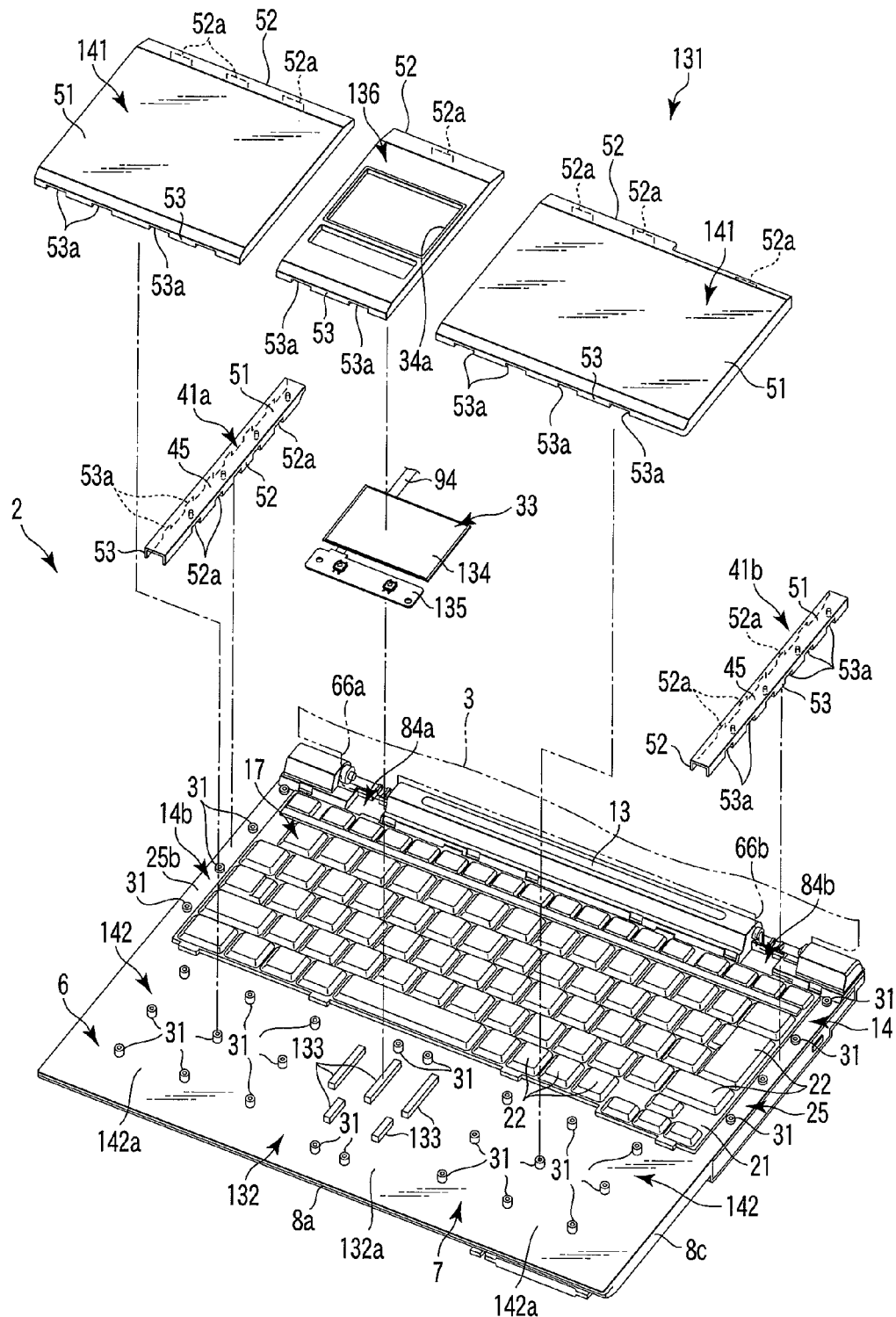
FIG. 25 is an exemplary perspective view of a part of a portable computer according to a fifth embodiment of the present invention.

As illustrated in FIGS. 25 and 26, the touchpad cover 136 has a first sidewall portion 52 in a rear end portion, and a second sidewall portion 53 in a front end portion. A cut-off portion 52a is formed in the first sidewall portion 52. Cut-off portions 53a are formed in the second sidewall portion 53. Thereby, when the touchpad cover 136 is attached to the touchpad placing portion 132, a gap functioning as a channel is formed between the touchpad cover 136 and the bottom surface 132a of the touchpad placing portion 132.

Figure 27:
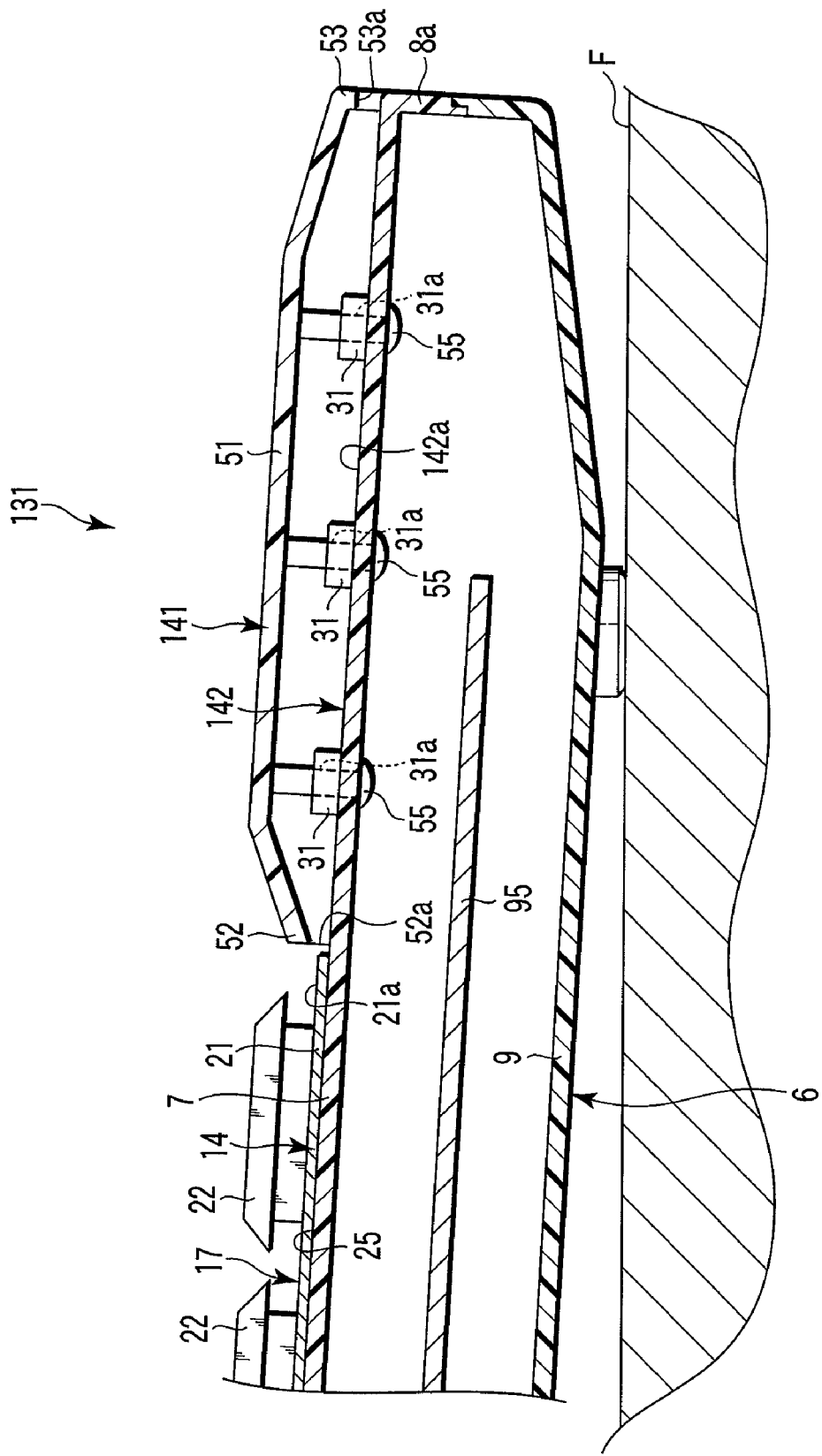
FIG. 27 is an exemplary cross-sectional view of a part of the portable computer of the fifth embodiment, including a palm rest member.

As illustrated in FIGS. 25 and 27, palm rest members 141 are formed as separate body from the housing 6. The top wall 7 of the housing 6 has bottom surfaces 142a of palm rest placing portions 142. The bottom surfaces 142a of the palm rest placing portions 142 connect with the bottom surface 25 of the keyboard placing portion 14, and are positioned on the same plane as the bottom surface 25 of the keyboard placing portion 14. Specifically, the height of the bottom surfaces 142a of the palm rest placing portions 142 is lower than the height of the top surface 21a of the base 21 of the keyboard 17 placed on the keyboard placing portion 14.

Figure 29:
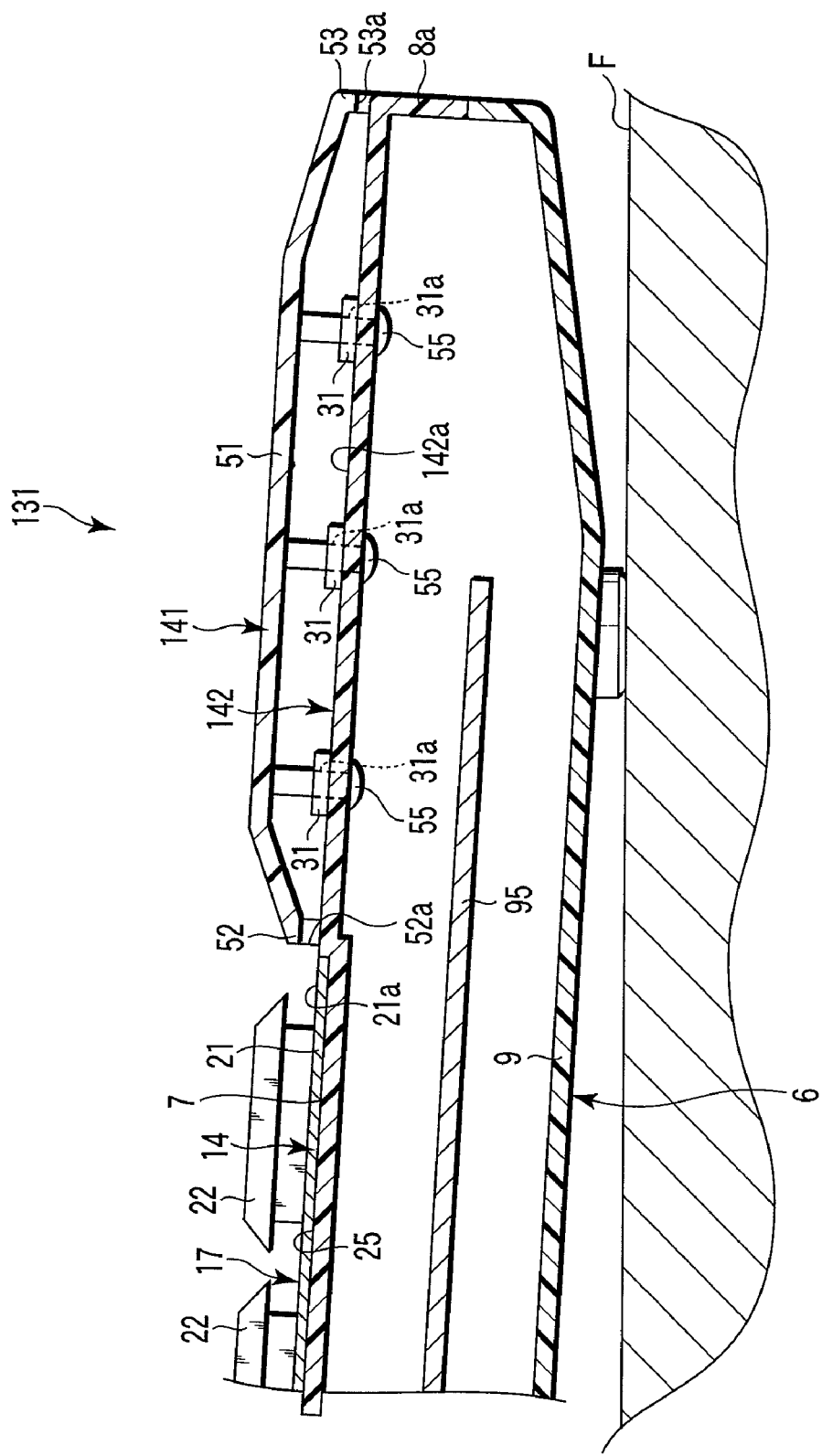
FIG. 29 is an exemplary cross-sectional view of another modification of the portable computer according to the fifth embodiment.

As in a modification illustrated in FIG. 29, the height of the bottom surfaces 142a of the palm rest placing portions 142 may be the same as the height of the top surface 21a of the base 21 of the keyboard 17 placed on the keyboard placing portion 14.

Since the bottom surfaces 142a of the palm rest placing portions 142 are as high as or lower than the top surface 21a of the base 21 of the keyboard 17 placed on the keyboard placing portion 14, the liquidproof property of the portable computer 131 is improved. The bottom surfaces 142a of the palm rest placing portions 142 extends from the front edge of the keyboard placing portion 14 to the front sidewall portion 8a of the housing 6.

As illustrated in FIG. 27, the palm rest members 141 are mounted on the palm rest placing portions 142. Each of the palm rest members 141 has a first sidewall portion 52 in a rear end portion, and a second sidewall portion 53 in a front end portion. Cut-off portions 52a are formed in the first sidewall portion 52. Cut-off portions 53a are formed in the second sidewall portion 53. Thereby, when the palm rest members 141 are mounted on the respective palm rest placing portions 142, gaps functioning as channels are formed between the palm rest members 141 and the bottom surfaces 142a of the palm rest placing portions 142. The cut-off portions 52a and 53a of the touchpad cover 136 and the cut-off portions 52a and 53a of the palm rest members 141 are formed in positions opposed to respective gaps between the keys 22 of the keyboard 17.

An example of the portable computer 131 is formed such that a front end portion of the main body 2 is lower than a rear end portion thereof when the portable computer 131 is placed on a placing surface F. Specifically, when the portable computer 131 is placed on the placing surface F, the bottom surfaces 25, 132a and 142a are inclined to be gradually lowered in this order from the keyboard placing portion 14, to the touchpad placing portion 132 and the palm rest placing portions 142.

According to the portable computer 131 having the above structure, the liquidproof property is improved. Specifically, since the keyboard placing portion 14 extends to the sidewall portions 8b and 8c, liquid spilled on the keyboard 17 is discharged from edges of the top wall 7 to the sides of the housing 6, without remaining in the keyboard placing portion 14. Therefore, there is little possibility that the liquid leaks inside the housing 6, and thus the liquidproof property of the portable computer 131 is improved.

Further, since the bottom surface 132a of the touchpad placing portion 132 and the bottom surfaces 142a of the palm rest placing portions 142 connect with the bottom surface 25 of the keyboard placing portion 14 and extend to the sidewall portion 8a of the housing 6, liquid spilled on the keyboard 17 is discharged to the side (more specifically, the front side being one of the sides) of the housing 6 through the touchpad placing portion 132 and the palm rest placing portions 142. This provides various liquid discharge routes, and improves the liquid drainage capability.

Further, since the touchpad cover 136 and the palm rest members 141 have the cut-off portions 52a and 53a, the liquid drainage capability of the portable computer 131 is not much deteriorated even when the touchpad cover 136 and the palm rest members 141 are attached to the top wall 7 of the housing 6.

For example, in the portable computer 131 having the keyboard placing portion 14 inclined downward toward the front, the liquid drainage capability is greatly improved by connecting the bottom surface 25 of the keyboard placing portion 14 with the bottom surface 132a of the touchpad placing portion 132 and the bottom surfaces 142a of the palm rest placing portion 142, which are positioned in front of the keyboard placing portion 14.

A channel may be formed only one of the touchpad placing portion 132 and the palm rest placing portions 142. Further, the portable computer 131 does not necessarily have to be inclined downward toward the front. Since the portable computer 131 having a channel in the touchpad placing portion 132 or the palm rest placing portions 142 has various drainage routes for discharging the spilled liquid, and thus has an improved liquid drainage capability.

Next, a portable computer 151 serving as an electronic apparatus according to sixth embodiment of the present invention is explained with reference to FIGS. 30 and 31. Constituent elements thereof having the same functions as those of the portable computer 1 according to the first embodiment are denoted by the same respective reference numerals, and explanations thereof are omitted.

Figure 30:
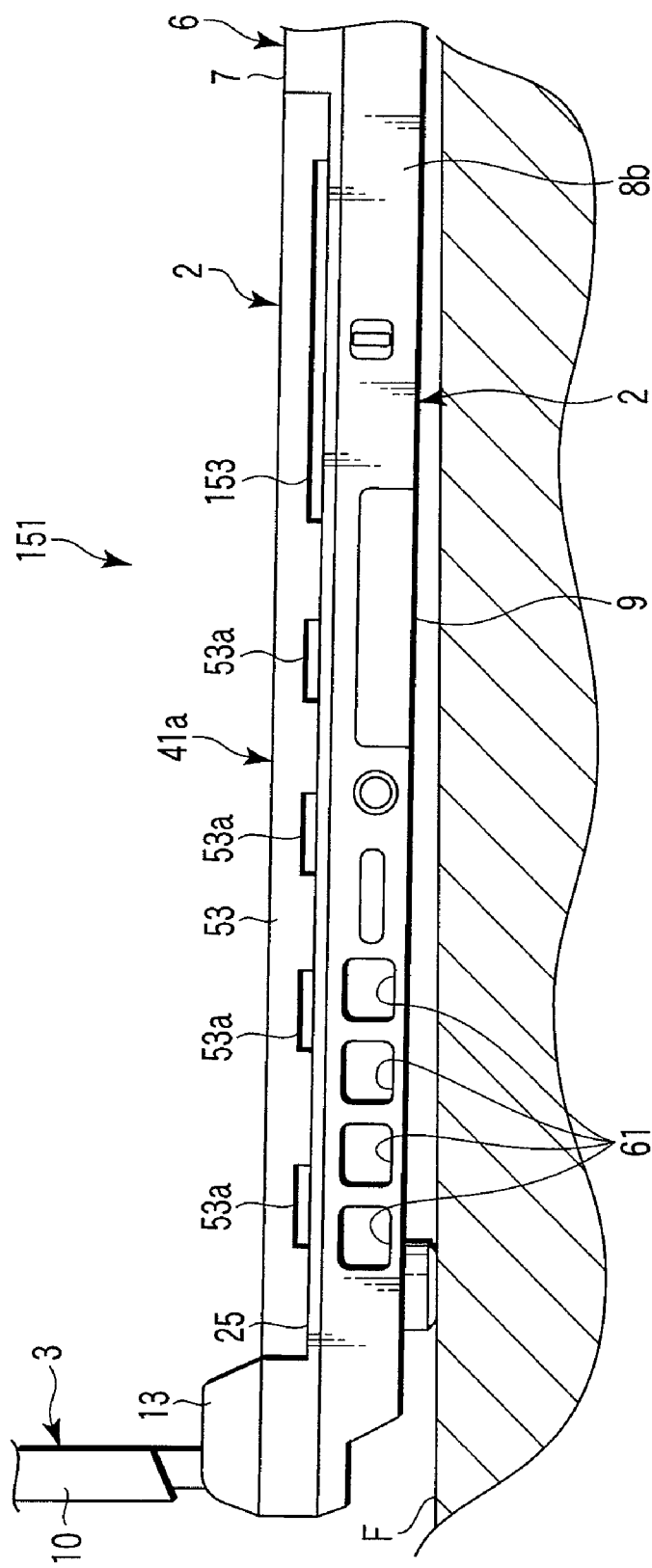
FIG. 30 is an exemplary side view of a portable computer according to a sixth embodiment of the present invention.

As illustrated in FIG. 30, the portable computer 151 is formed such that a front end portion of the main body 2 is lower than a rear end portion thereof when the portable computer 151 is placed on a placing surface F. Specifically, when the portable computer 151 is placed on the placing surface F, the portable computer 151 is inclined such that a front end portion of the keyboard placing portion 14 is lower than a rear end portion thereof.

Figure 31:
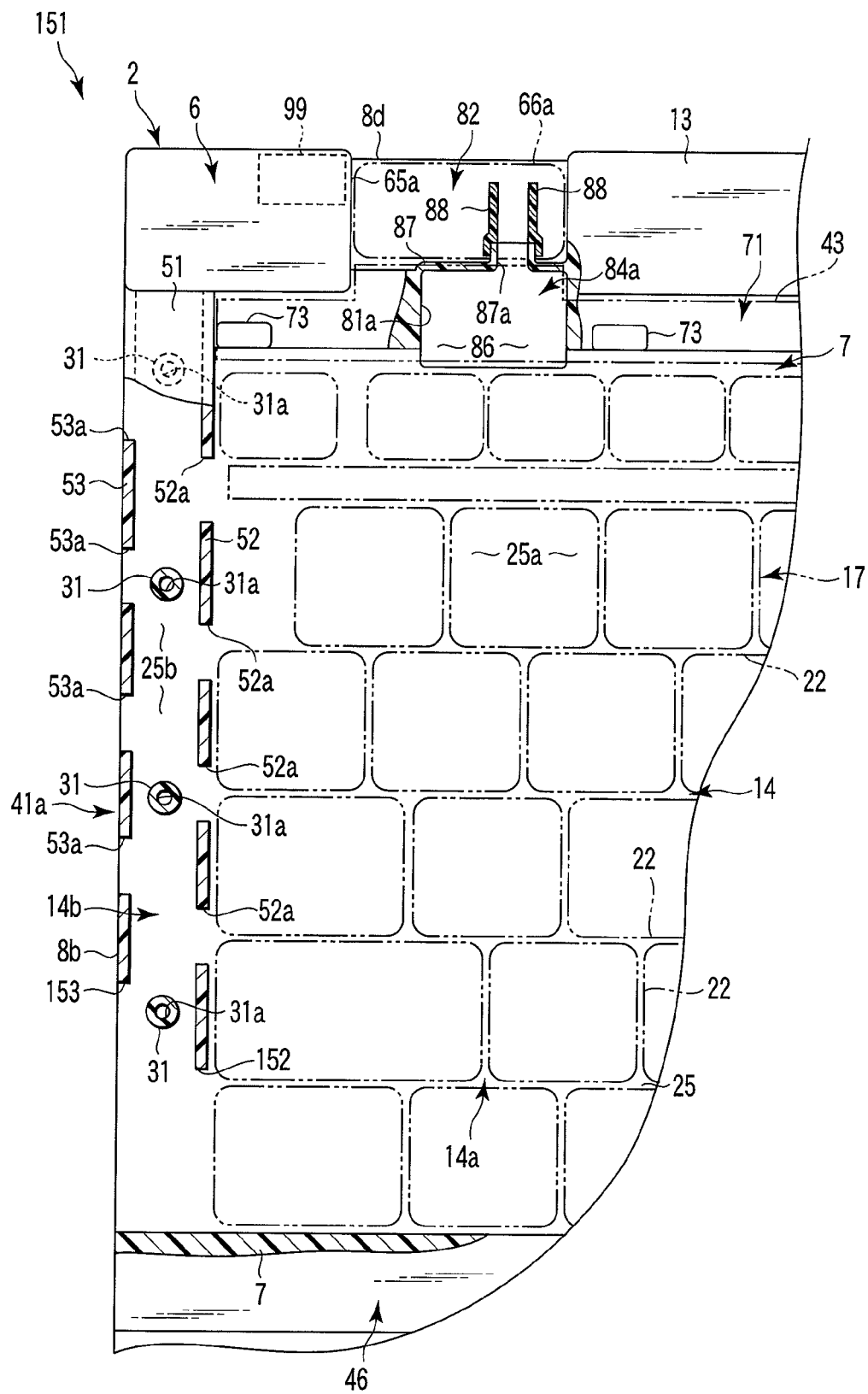
FIG. 31 is an exemplary plan view of the portable computer according to the sixth embodiment, including a cross section of a part of the portable computer.

As illustrated in FIG. 31, cut-off portions 152 and 153 are formed in regions of left and right frame members 41a and 41b opposed to a front end portion of the keyboard placing portion 14. The cut-off portions 152 and 153 are larger than other cut-off portions 52a and 53a formed in the left and the right frame members 41a and 41b.

According to the portable computer 151 having the above structure, the liquidproof property is improved. Specifically, since the keyboard placing portion 14 extends to the sidewall portions 8b and 8c, liquid spilled on the keyboard 17 is discharged from edges of the top wall 7 to the sides of the housing 6, without remaining in the keyboard placing portion 14. Therefore, there is little possibility that the liquid leaks inside the housing 6, and thus the liquidproof property of the portable computer 151 is improved.

For example, in the portable computer 151 in which the keyboard placing portion 14 is inclined downward toward the front, liquid spilled on the keyboard 17 flows into a front end portion of the keyboard placing portion 14, and tends to remain in the front end portion of the keyboard placing portion 14. Since large cut-off portions 152 and 153 are formed in regions corresponding to the front end portion of the keyboard placing portion 14, liquid gathered in the front end portion of the keyboard placing portion 14 is efficiently discharged to the sides of the housing 6. This enhances the liquid drainage capability, and contributes to improvement in liquid proof property of the portable computer 151.

The present invention is not limited to the portable computers 1, 101, 111, 121, 131, and 151 according to the first to sixth embodiments described above. The constituent elements according to the first to sixth embodiments can be used in various combinations according to necessity.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing comprising a top wall, and first and second outer sidewall portions extending from mutually different edges of the top wall;
   a keyboard that comprises a plurality of keys and a base on which the keys are mounted;
   a keyboard placing portion on which the keyboard is placed, the keyboard placing portion comprising a bottom surface provided in the top wall, at least part of the bottom surface extending to outward-facing, exterior surfaces of the first and second outer sidewall portions of the housing, wherein the keyboard placing portion includes a first region on which the keyboard is mounted, and second regions formed between the first region and the first and second outer sidewall portions of the housing, wherein a height of a first bottom surface of the second regions is lower than a height of a top surface of the base of the keyboard placed on the first region, and wherein the first bottom surface of the second regions of the keyboard placing portion extends to the first and second outer sidewall portions of the housing; and
   a frame member which is placed on the second regions of the keyboard placing portion, wherein at least part of the frame member forms a gap between the frame member and the first bottom surface of the second regions, wherein the frame member includes a cut-off portion which forms the gap between the frame member and the first bottom surface of the second region, and the cut-off portion is formed in position opposed to a gap between keys of the keyboard.

2. An electronic apparatus according to claim 1 further comprising:
   a display unit; and
   a hinge part which rotatably connects the display unit with the housing,
   wherein the top wall comprises a second bottom surface connecting with the keyboard placing portion, the second bottom surface extends from an edge of the keyboard placing portion to a third outer sidewall portion of the housing, and a height of the second bottom surface is lower than the height of the top surface of the base of the keyboard placed on the keyboard placing portion, and
   wherein the top wall of the housing includes a projecting portion opposed to the display unit, and a depressed portion which is formed in the projecting portion and to which the hinge part is attached, and the second bottom surface is formed in the depressed portion.

3. An electronic apparatus according to claim 2, further comprising:
   a cooling fan contained in the housing,
   wherein an air outlet opposed to the cooling fan is formed in one of the outer sidewall portions of the housing to which the first bottom surface of the keyboard placing portion extends.

4. An electronic apparatus according to claim 3 further comprising:
   a first holder which is attached to the top wall of the housing and holds down one end portion of the keyboard to the keyboard placing portion; and
   a second holder which is attached to the top wall of the housing and holds down another end portion of the keyboard to the keyboard placing portion.

5. An electronic apparatus according to claim 2, further comprising:
   a touchpad unit; and
   a touchpad placing portion which is formed on the housing and to which the touchpad unit is attached,
   wherein the touchpad placing portion includes a bottom surface connecting with the keyboard placing portion, the bottom surface of the touchpad placing portion extends from an edge of the keyboard placing portion to a fourth outer sidewall portion of the housing, and a height of the bottom surface of the touchpad placing portion is lower than the height of the top surface of the base of the keyboard placed on the keyboard placing portion.

6. An electronic apparatus according to claim 2, further comprising:
   a palm rest member formed separately from the housing; and
   a palm rest placing portion which is formed on the housing and to which the palm rest member is attached,
   wherein the palm rest placing portion includes a bottom surface connecting with the keyboard placing portion, the bottom surface of the palm rest placing portion extends from an edge of the keyboard placing portion to a fourth outer sidewall portion of the housing, and a height of the bottom surface of the palm rest placing portion is lower than the height of the top surface of the base of the keyboard placed on the keyboard placing portion.

7. An electronic apparatus according to claim 2, wherein an edge of the keyboard reaches the first or second outer sidewall portion of the housing.

8. An electronic apparatus comprising:
   a housing comprising a top wall, and a first side portion extending from a first edge of the top wall;
   a keyboard;
   a keyboard placement area upon at least a portion of which the keyboard is placed, the keyboard placement area comprising at least a portion of the top wall, at least part of the keyboard placement area extending to the first edge of the top wall without increasing in height, wherein the keyboard comprises a plurality of keys and a base on which the keys are mounted, the keyboard placement area comprises a first region on which the keyboard is mounted and a second region formed between the first region and the first edge of the top wall, and the height of the second region is lower than the height of a top surface of the base of the keyboard placed on the first region;
   a frame member which is placed on the second region of the keyboard placement area, wherein at least part of the frame member forms a gap between the frame member and the keyboard placement area in the second region;
   a display unit; and
   a hinge part which rotatably connects the display unit with the housing,
   wherein the housing further comprises a second side portion extending from a second edge of the top wall, and the keyboard placement area extends to the first and second edges, and
   wherein the top wall comprises a hinge mounting portion connecting with the keyboard placement area, the height of the hinge mounting portion being lower than the height of the top surface of the base of the keyboard placed on the keyboard placement area.

9. An electronic apparatus according to claim 8, further comprising:
   a cooling fan contained in the housing, wherein an air outlet opposed to the cooling fan is formed in one of the outer sidewall portions of the housing.

10. An electronic apparatus comprising:

a housing comprising a top wall, and outward-facing, exterior surfaces of first and second outer sidewall portions extending from first and second edges, respectively, of the top wall;

a keyboard that comprises a plurality of keys and a base on which the keys are mounted;

a keyboard placement area upon at least a portion of which the keyboard is placed, the keyboard placement area comprising at least a portion of the top wall, at least part of the keyboard placement area extending to the first and second edges of the top wall without increasing in height, wherein the keyboard placement area comprises a first region on which the keyboard is mounted and second regions formed between the first region and the first and second edges of the top wall, and wherein the height of the second regions is lower than the height of a top surface of the base of the keyboard placed on the first region; and a frame member which is placed on the second regions of the keyboard placement area, wherein at least part of the frame member forms a gap between the frame member and the keyboard placement area in the second regions, wherein the frame member comprises a cut-off portion which forms the gap, and the cut-off portion is aligned to gaps between keys of the keyboard.

\* \* \* \* \*